United States Patent
Kim et al.

(10) Patent No.: US 10,749,640 B2
(45) Date of Patent: Aug. 18, 2020

(54) METHOD AND APPARATUS FOR TRANSMITTING AND RECEIVING UPLINK CONTROL CHANNEL IN COMMUNICATION SYSTEM

(71) Applicant: Electronics and Telecommunications Research Institute, Daejeon (KR)

(72) Inventors: Cheul Soon Kim, Daejeon (KR); Min Hyun Kim, Busan (KR); Ji Hyung Kim, Daejeon (KR); Sung Hyun Moon, Daejeon (KR); Ju Ho Park, Daejeon (KR); Jung Hoon Lee, Daejeon (KR); Tae Joong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 55 days.

(21) Appl. No.: 15/934,001

(22) Filed: Mar. 23, 2018

(65) Prior Publication Data

US 2018/0278380 A1  Sep. 27, 2018

(30) Foreign Application Priority Data

| Mar. 24, 2017 | (KR) | 10-2017-0037880 |
| Jun. 16, 2017 | (KR) | 10-2017-0076863 |
| Nov. 17, 2017 | (KR) | 10-2017-0154246 |
| Nov. 27, 2017 | (KR) | 10-2017-0159628 |
| Jan. 12, 2018 | (KR) | 10-2018-0004444 |
| Mar. 12, 2018 | (KR) | 10-2018-0028852 |

(51) Int. Cl.
| H04L 1/18 | (2006.01) |
| H04L 1/16 | (2006.01) |
| H04L 5/00 | (2006.01) |
| H04L 1/08 | (2006.01) |
| H04W 72/04 | (2009.01) |

(52) U.S. Cl.
CPC .............. *H04L 1/1861* (2013.01); *H04L 1/08* (2013.01); *H04L 1/1671* (2013.01); *H04L 1/1812* (2013.01); *H04L 1/1854* (2013.01); *H04L 1/1858* (2013.01); *H04L 5/0051* (2013.01); *H04L 5/0055* (2013.01);
(Continued)

(58) Field of Classification Search
CPC ........................ H04L 1/1896; H04W 72/0413
See application file for complete search history.

(56) References Cited

U.S. PATENT DOCUMENTS

| 8,885,526 B2 | 11/2014 | He et al. |
| 9,247,534 B2 * | 1/2016 | Han .................. H04W 72/0413 |

(Continued)

*Primary Examiner* — Melanie Jagannathan
(74) *Attorney, Agent, or Firm* — Rabin & Berdo, P.C.

(57) ABSTRACT

An operation method of a terminal in a communication system may comprise receiving a downlink data channel from a base station in a slot # n or a slot # (n–1); receiving a slot format indicator (SFI) indicating a format of a slot # (n+k) in which an uplink control information (UCI) is to be transmitted, from the base station in the slot # n; and transmitting the UCI including a hybrid automatic repeat request (HARQ) response for the downlink data channel to the base station in the slot # (n+k). Here, each of n and k may be an integer equal to or greater than 0, and 1 may be an integer equal to or greater than 1.

3 Claims, 20 Drawing Sheets

(52) U.S. Cl.
CPC ............ *H04L 5/0064* (2013.01); *H04L 5/001* (2013.01); *H04L 5/0091* (2013.01); *H04W 72/0413* (2013.01)

(56) References Cited

U.S. PATENT DOCUMENTS

| | | | |
|---|---|---|---|
| 9,362,998 B2 | 6/2016 | He et al. | |
| 9,577,803 B2 | 2/2017 | Yan et al. | |
| 9,614,649 B2 | 4/2017 | Yang et al. | |
| 2010/0331037 A1* | 12/2010 | Jen | H04W 52/146 455/522 |
| 2012/0176947 A1* | 7/2012 | Xi | H04L 1/1671 370/311 |
| 2012/0207040 A1* | 8/2012 | Comsa | H04W 72/1215 370/252 |
| 2012/0320880 A1* | 12/2012 | Han | H04L 5/001 370/335 |
| 2014/0233469 A1* | 8/2014 | Seo | H04L 5/001 370/329 |
| 2014/0233520 A1* | 8/2014 | Lee | H04B 7/0456 370/329 |
| 2015/0124771 A1 | 5/2015 | Ko et al. | |
| 2015/0215080 A1* | 7/2015 | Kim | H04L 1/1896 370/329 |
| 2016/0143030 A1 | 5/2016 | Lee et al. | |
| 2016/0226643 A1 | 8/2016 | Mallik et al. | |
| 2016/0261392 A1 | 9/2016 | Nammi et al. | |
| 2016/0285595 A1* | 9/2016 | Chen | H04L 1/1864 |
| 2017/0367046 A1* | 12/2017 | Papasakellariou | H04L 5/0048 |
| 2018/0123765 A1* | 5/2018 | Cao | H04L 1/1819 |
| 2018/0139014 A1* | 5/2018 | Xiong | H04L 5/0055 |
| 2018/0279358 A1* | 9/2018 | Babaei | H04W 72/0453 |
| 2018/0367185 A1* | 12/2018 | Yi | H04B 1/7143 |
| 2019/0159191 A1* | 5/2019 | Kim | H04L 5/00 |
| 2019/0268903 A1* | 8/2019 | Lee | H04W 72/14 |
| 2019/0342037 A1* | 11/2019 | Karaki | H04L 1/188 |

* cited by examiner

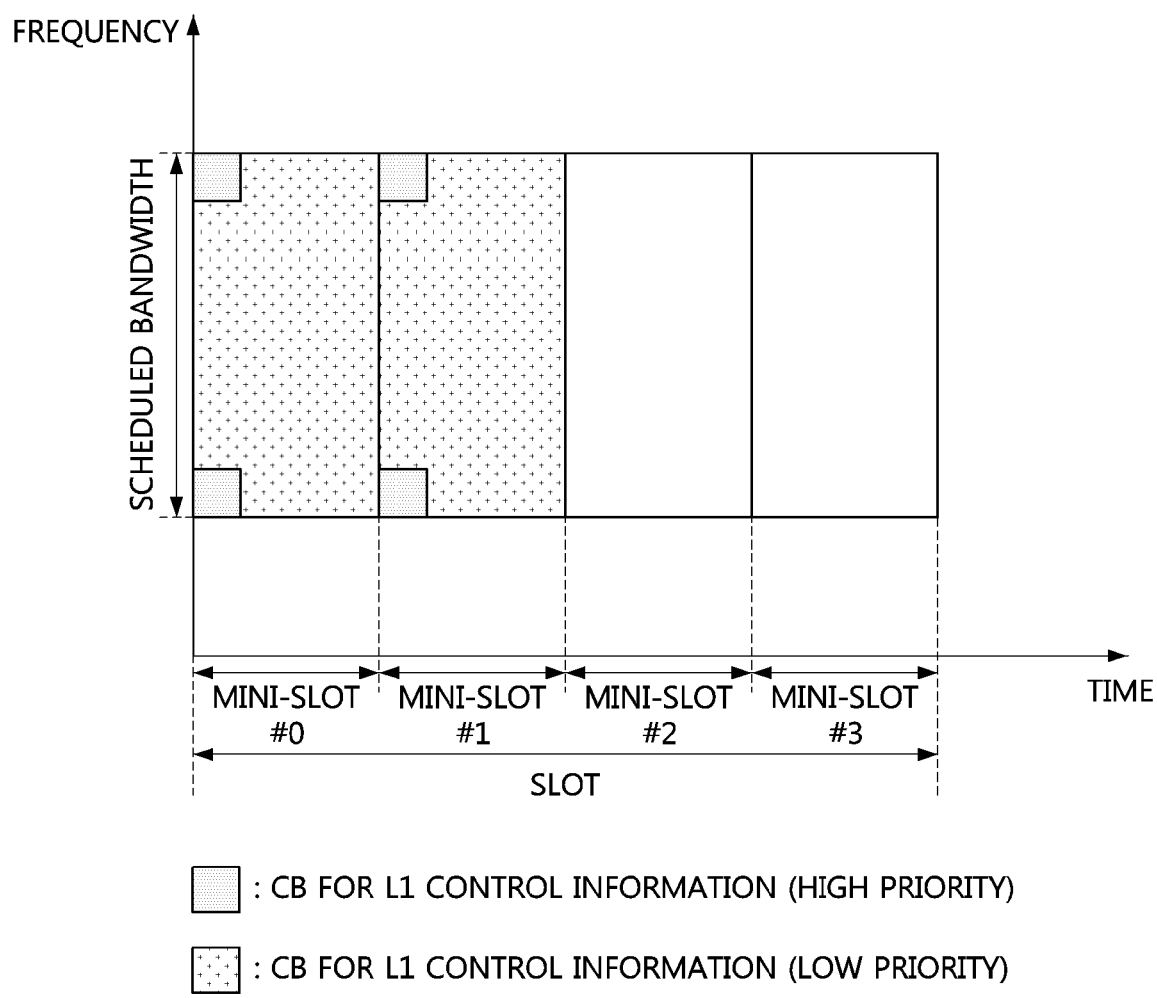

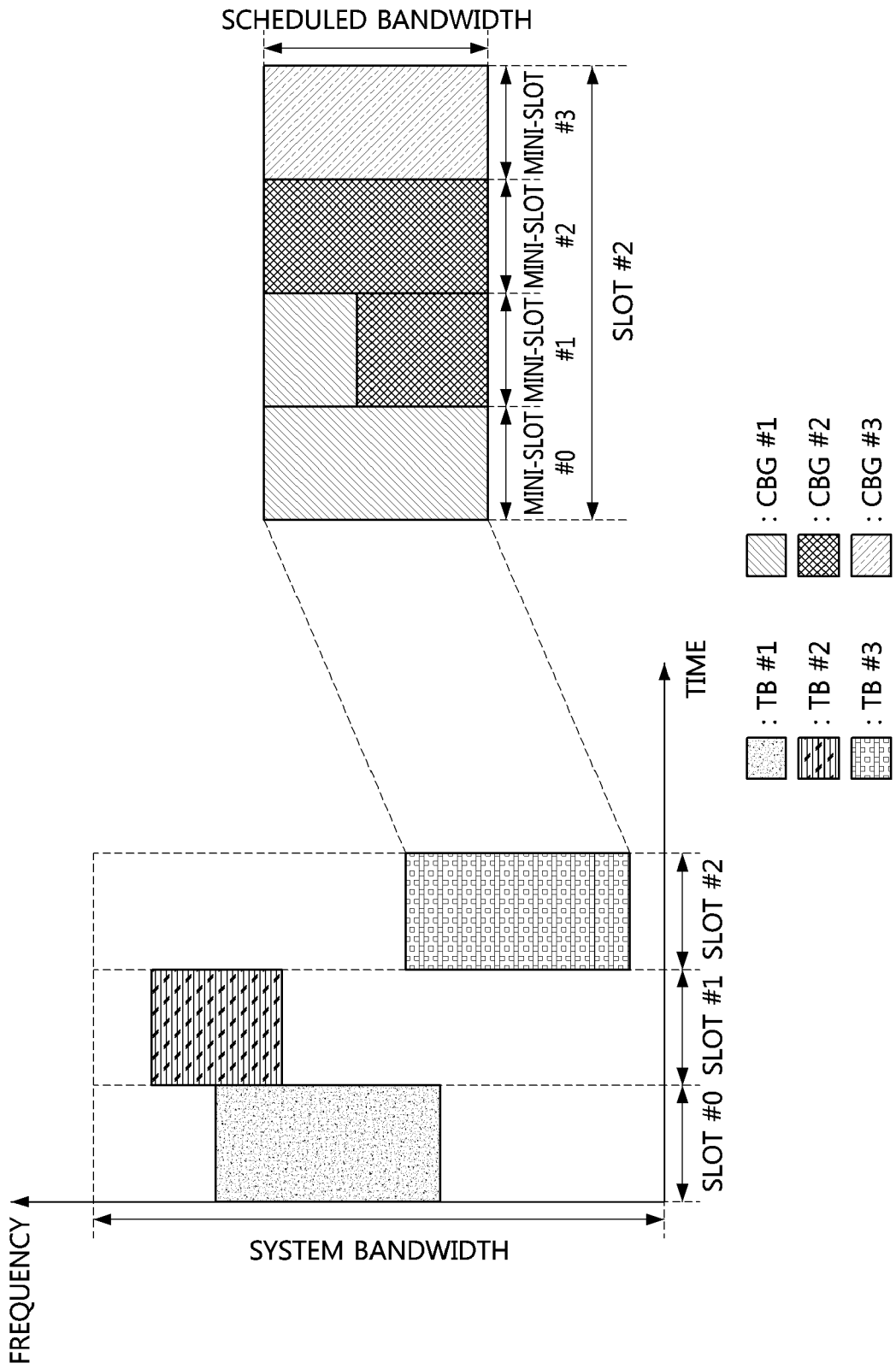

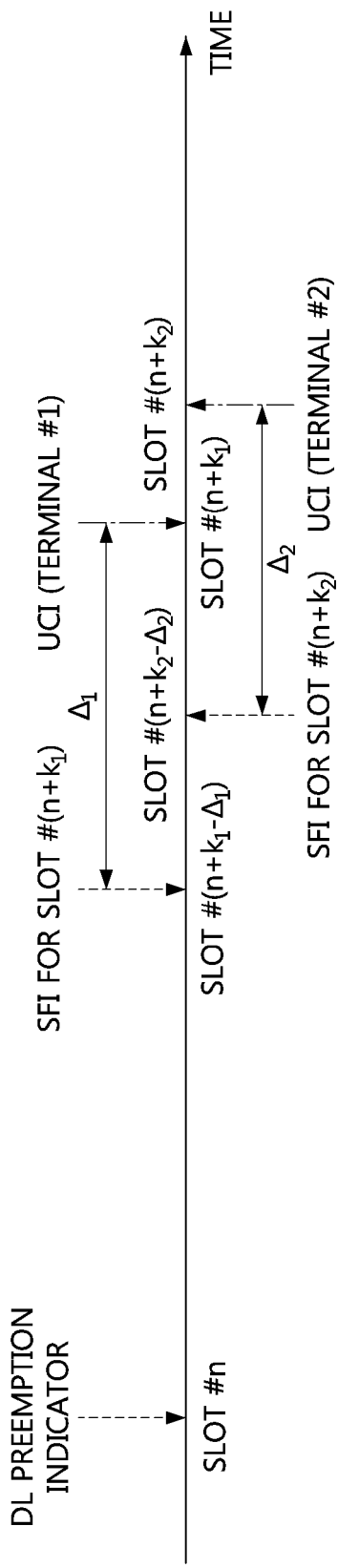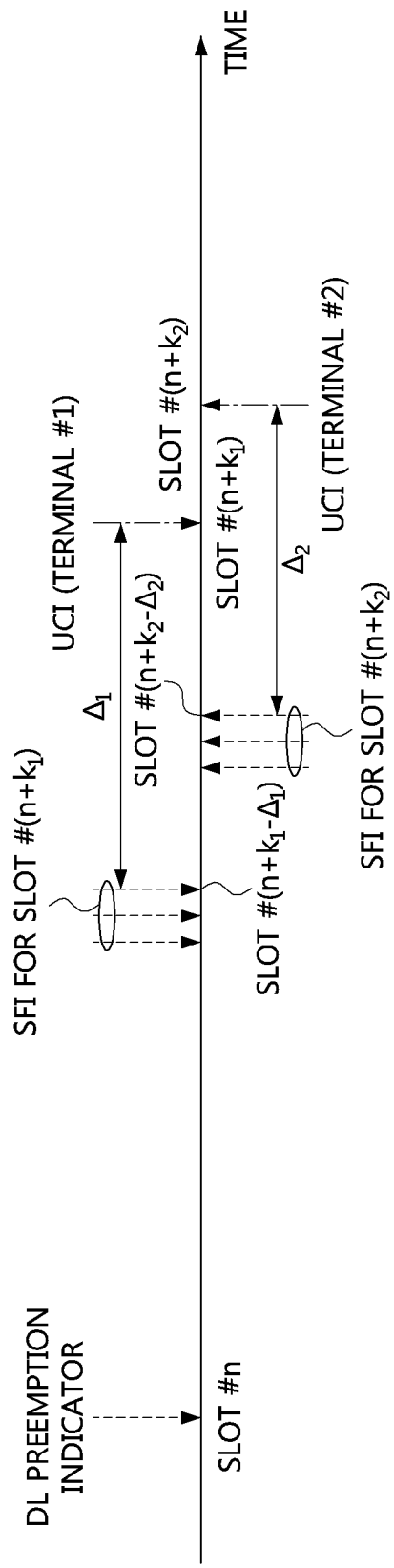

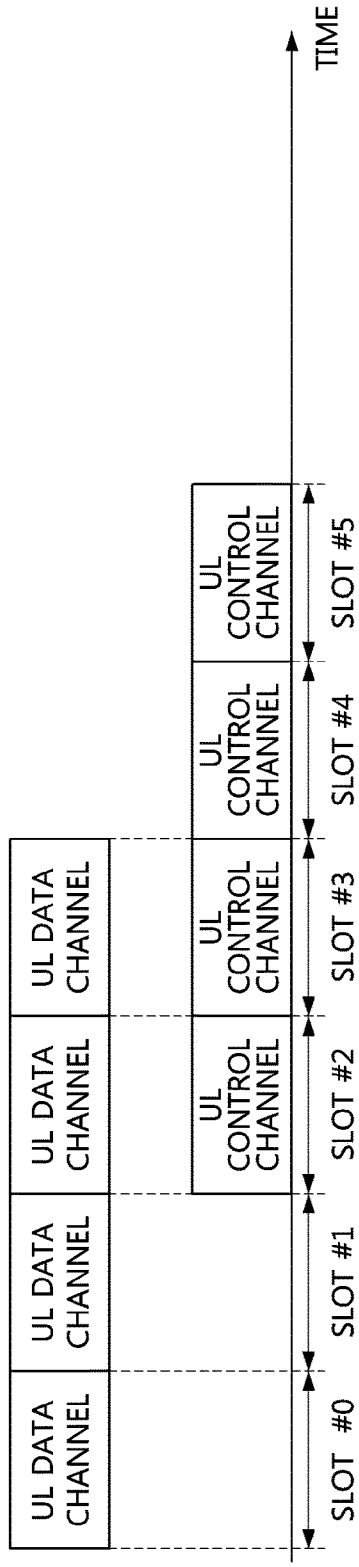
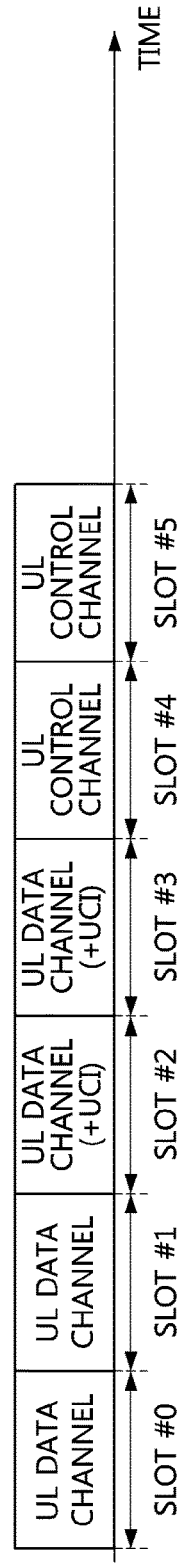
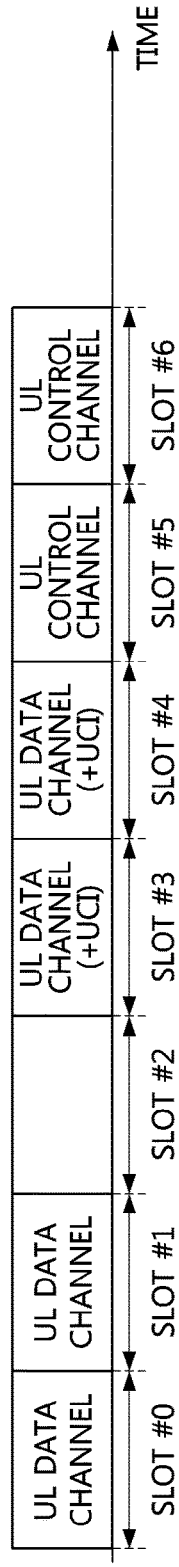

METHOD AND APPARATUS FOR TRANSMITTING AND RECEIVING UPLINK CONTROL CHANNEL IN COMMUNICATION SYSTEM

CROSS-REFERENCE TO RELATED APPLICATIONS

This application claims priorities to Korean Patent Applications No. 10-2017-0037880 filed on Mar. 24, 2017, No. 10-2017-0076863 filed on Jun. 16, 2017, No. 10-2017-0154246 filed on Nov. 17, 2017, No. 10-2017-0159628 filed on Nov. 27, 2017, No. 10-2018-0004444 filed on Jan. 12, 2018, and No. 10-2018-0028852 filed on Mar. 12, 2018 in the Korean Intellectual Property Office (KIPO), the entire contents of which are hereby incorporated by reference.

BACKGROUND

1. Technical Field

The present disclosure relates to wireless communication technologies, and more specifically, to wireless communication technologies for transmitting and receiving an uplink control channel in a communication system.

2. Related Art

The communication system may include a core network, a base station, a terminal, and the like. When downlink transmission is performed in the communication system, the base station may transmit a downlink signal (e.g., control information, data, reference signal, etc.) to the terminal. When uplink transmission is performed in the communication system, the terminal may transmit an uplink signal (e.g., control information, data, reference signal, etc.) to the base station.

The control information transmitted from the base station to the terminal may be referred to as downlink control information, and the control information transmitted from the terminal to the base station may be referred to as uplink control information. The uplink control information may include at least one of a scheduling request (SR), channel state information (CSI), and a hybrid automatic repeat request (HARQ) response.

Meanwhile, since a 5G communication system (e.g., a new radio (NR) system) supports dynamic time division duplex (TDD), beam-centric communication, and low-delay communication, the number of uplink symbols allowed to transmit the uplink control information may be variable. The number of uplink symbols allowed for the transmission of uplink control information may be limited. For example, when the amount of downlink data is large, the number of uplink symbols allowed to transmit the uplink control information may be relatively small. Therefore, a transmission and reception technique of an uplink control channel is needed to support a case where the number of downlink symbols allowed for the transmission of uplink control information is variable.

SUMMARY

Accordingly, embodiments of the present disclosure provide a method and an apparatus for transmitting and receiving uplink control channels in a communication system.

In order to achieve the objective of the present disclosure, an operation method of a terminal in a communication system may comprise receiving a downlink data channel from a base station in a slot # n or a slot # (n−1); receiving a slot format indicator (SFI) indicating a format of a slot # (n+k) in which an uplink control information (UCI) is to be transmitted, from the base station in the slot # n; and transmitting the UCI including a hybrid automatic repeat request (HARQ) response for the downlink data channel to the base station in the slot # (n+k), wherein each of n and k is an integer equal to or greater than 0, and 1 is an integer equal to or greater than 1.

The SFI may indicate a format of the slot # (n+k) to a slot # (n+k+j), and j is an integer equal to or greater than 1.

SFIs for two or more different slots may be transmitted in the slot # n, one of the two or more different SFIs may indicate the format of the slot # (n+k), and remaining SFIs of the two or more different SFIs may respectively indicate formats of slots consecutive with the slot # (n+k).

SFIs for two or more different slots may be transmitted in the slot # n, one of the two or more different SFIs may indicate the format of the slot # (n+k), remaining SFIs of the two or more different SFIs may respectively indicate formats of slots prior to the slot # n, and the remaining SFIs may indicate formats of slots other than the slot # (n+k).

The SFI may indicate a number of one or more symbols used for transmission of at least the UCI in the slot # (n+k).

The SFI may be received through a common control channel in the slot # n.

A time interval between the slot # n and the slot # (n+k) may be a minimum time required for generating the HARQ response for the downlink data channel.

In order to achieve the objective of the present disclosure, an operation method of a terminal in a communication system may comprise receiving a downlink data channel from a base station in a slot # n; repeatedly transmitting an uplink data channel to the base station in slots # (n+l) to # (n+l+k) k times; and repeatedly transmitting an uplink control information (UCI) including a hybrid automatic repeat request (HARQ) response for the downlink data channel in slots # (n+m) to # (n+m+k') k' times, wherein each of n, l, and m is an integer equal to or greater than 0, each of k and k' is an integer equal to or greater than 1, and the uplink data channel and the UCI are simultaneously transmitted in at least one slot.

When the uplink data channel and the UCI are simultaneously transmitted in the at least one slot, the UCI may be transmitted through the uplink data channel instead of an uplink control channel.

The UCI may be transmitted through at least one punctured resource element (RE) among REs configured for the uplink data channel.

When the UCI is mapped to at least one RE configured for the uplink data channel, uplink data may be mapped to remaining REs excluding the at least one RE to which the UCI is mapped among REs configured for the uplink data channel, and a rate matching operation may be performed on the uplink data when the RE mapping operation is performed.

When there are p slots including an unknown symbol among the slots # (n+l) to # (n+m+k'), and the unknown symbol is overlapped with a resource used for transmission of the uplink data channel or the UCI, the uplink data channel and the UCI may not be transmitted in the p slots, the uplink data channel may be repeatedly transmitted k times in the slots # (n+l) to # (n+l+k+p), the UCI may be repeatedly transmitted k' times in the slots # (n+m) to # (n+m+k'+p), and p may be an integer equal to or greater than 1.

When there are p slots including an unknown symbol among the slots # (n+l) to # (n+m+k'), and the unknown symbol is overlapped with a resource used for transmission of the uplink data channel or the UCI, the uplink data channel and the UCI may not be transmitted in the p slots, the uplink data channel may be repeatedly transmitted (k−p) times in the slots # (n+l) to # (n+l+k), the UCI may be repeatedly transmitted (k'−p) times in the slots # (n+m) to # (n+m+k'), and p may be an integer equal to or greater than 1.

The number (k) of repeated transmissions of the uplink data channel and the number (k') of repeated transmissions of the UCI may be set through at least one of an upper layer signaling procedure and a downlink control information (DCI) transmission procedure.

In order to achieve the objective of the present disclosure, an operation method of a terminal in a communication system may comprise receiving a downlink data channel from a base station in a slot # n; repeatedly transmitting an uplink control information (UCI) including a hybrid automatic repeat request (HARQ) response for the downlink data channel to the base station k times in slots # (n+l) to # (n+l+k); and repeatedly transmitting the uplink data channel k' times in slots # (n+m) to # (n+m+k'), wherein n is an integer equal to or greater than 0, each of l and m is an integer equal to or greater than 1, each of k and k' is an integer equal to or greater than 2, the UCI and the uplink data channel are simultaneously transmitted in at least one slot.

When the uplink data channel and the UCI are simultaneously transmitted in the at least one slot, the UCI may be transmitted through the uplink data channel instead of an uplink control channel.

The UCI may be transmitted through at least one punctured resource element (RE) among REs configured for the uplink data channel.

When the UCI is mapped to at least one RE configured for the uplink data channel, uplink data may be mapped to remaining REs excluding the at least one RE to which the UCI is mapped among REs configured for the uplink data channel, and a rate matching operation may be performed on the uplink data when the RE mapping operation is performed.

When there are p slots including an unknown symbol among the slots # (n+l) to # (n+m+k'), and the unknown symbol is overlapped with a resource used for transmission of the uplink data channel or the UCI, the uplink data channel and the UCI may not be transmitted in the p slots, the UCI may be repeatedly transmitted k times in the slots # (n+l) to # (n+l+k+p), the uplink data channel may be repeatedly transmitted k' times in the slots # (n+m) to # (n+m+k'+p), and p may be an integer equal to or greater than 1.

When there are p slots including an unknown symbol among the slots # (n+l) to # (n+m+k'), and the unknown symbol is overlapped with a resource used for transmission of the uplink data channel or the UCI, the uplink data channel and the UCI may not be transmitted in the p slots, the UCI may be repeatedly transmitted (k−p) times in the slots # (n+l) to # (n+l+k), the uplink data channel may be repeatedly transmitted (k'−p) times in the slots # (n+m) to # (n+m+k'), and p may be an integer equal to or greater than 1.

According to the embodiments of the present disclosure, L1 control information can be transmitted through resources configured for downlink data channel. In this case, the L1 control information may be mapped to REs adjacent to the DM-RS. Thus, a reception error of the L1 control information can be minimized, and a frequency multiplexing gain for the L1 control information can also be obtained.

In addition, a base station can transmit a preemption indicator indicating that a downlink data channel #2 for a second terminal is to be transmitted through a pre-configured resource among resources configured for a downlink data channel #1 for a first terminal. The terminal can generate an HARQ response for the downlink data channel #1 based on the preemption indicator, and transmit the generated HARQ response to the base station. Thus, the resource utilization rate can be improved, and the reception error of the HARQ response can be reduced.

In addition, the terminals can receive the downlink data channels #1 and #2 and can repeatedly transmit the HARQ responses #1 and #2 for the downlink data channels #1 and #2, respectively. The HARQ responses #1 and #2 can be transmitted simultaneously through the same slot. Therefore, the reception error of the HARQ response can be reduced.

BRIEF DESCRIPTION OF DRAWINGS

Embodiments of the present disclosure will become more apparent by describing in detail embodiments of the present disclosure with reference to the accompanying drawings, in which:

FIG. 7B is a conceptual diagram illustrating a fourth embodiment of a method of mapping L1 control information;

FIG. 8 is a conceptual diagram illustrating a first embodiment of a data channel;

FIG. 12A is a timing chart illustrating a first embodiment of a method of transmitting uplink control information;

FIG. 12B is a timing diagram illustrating a second embodiment of a method of transmitting uplink control information;

FIG. 16A is a timing chart illustrating a first embodiment of a transmission scheme of uplink control/data channel in a communication system;

FIG. 16B is a timing chart illustrating a second embodiment of a transmission scheme of uplink control/data channel in a communication system;

FIG. 16C is a timing chart illustrating a third embodiment of a transmission scheme of uplink control/data channel in a communication system;

DETAILED DESCRIPTION

Figure 1:
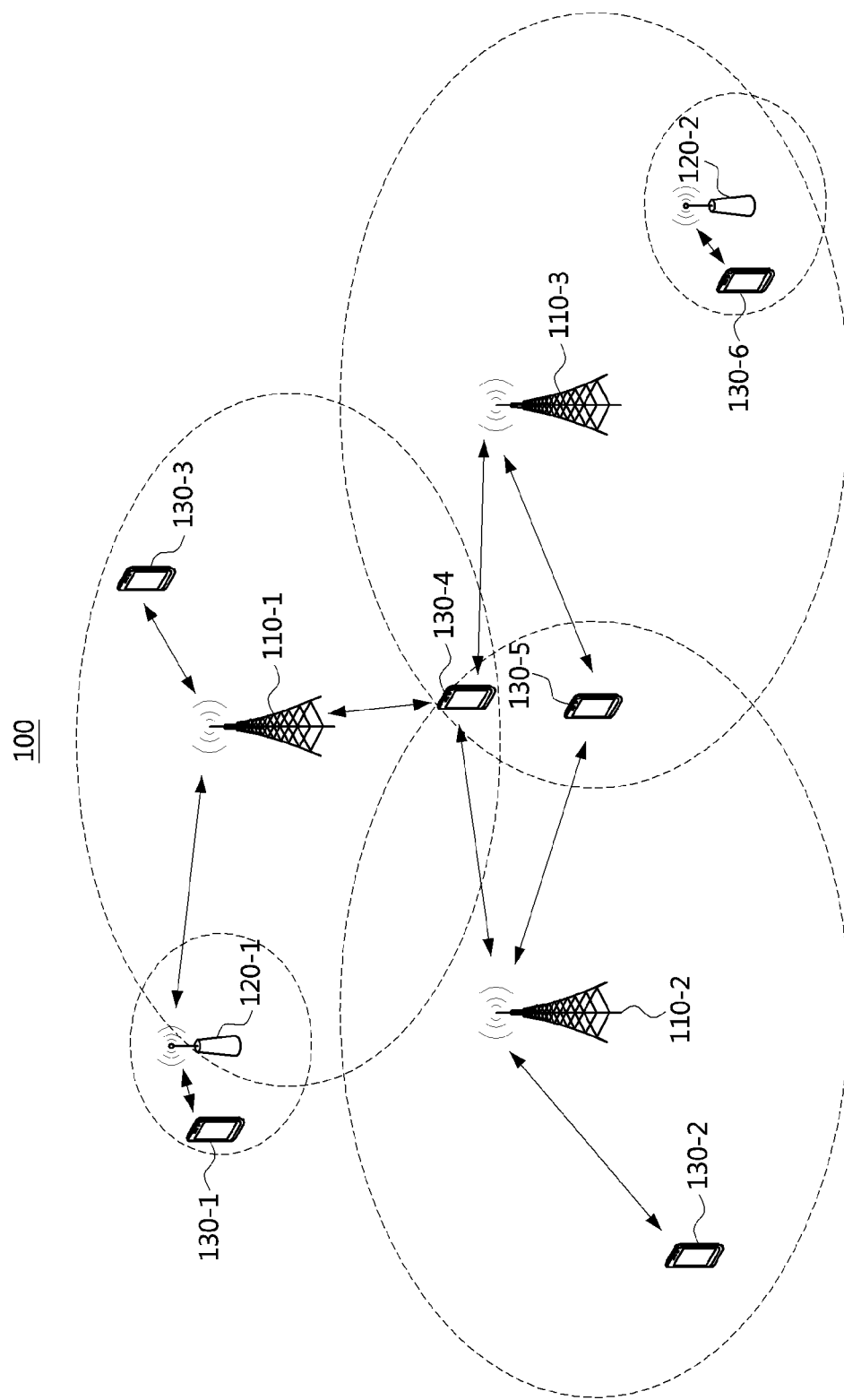
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, a communication system to which embodiments according to the present disclosure will be described. However, the communication system to which embodiments according to the present disclosure are applied are not restricted to what will be described below. That is, the embodiments according to the present disclosure may be applied to various communication systems. Here, the term 'communication system' may be used with the same meaning as the term 'communication network'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like).

The plurality of communication nodes may support 4$^{th}$ generation (4G) communication (e.g., long term evolution (LTE), LTE-advanced (LTE-A)), or 5$^{th}$ generation (5G) communication defined in the 3$^{rd}$ generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
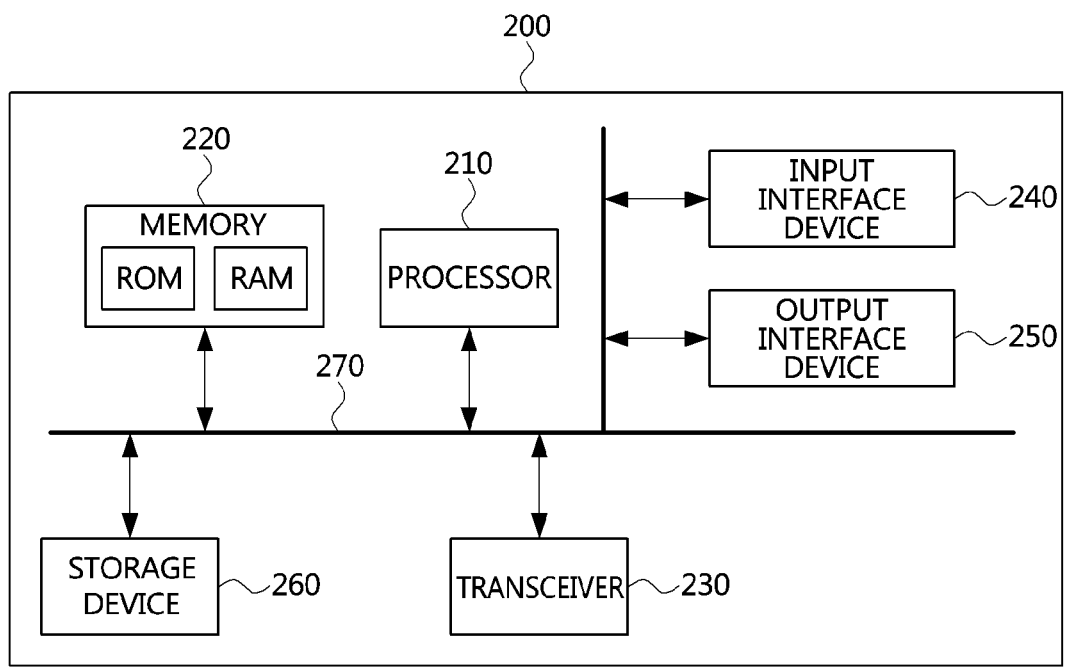
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods of transmitting and receiving an uplink control channel in a communication system will be described. Even if a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

The NR system may support dual connectivity (DC) and carrier aggregation (CA) by operating one or more component carriers (CCs). A physical channel through which a hybrid automatic repeat request (HARQ) response is transmitted when a plurality of CCs are operated and a physical channel through which an HARQ response is transmitted when one CC is operated may be configured as follows. Here, the HARQ response may be an acknowledgment (ACK), a negative ACK (NACK), or the like.

In the NR system, communications may be performed on a transport block (TB) basis, and an encoded TB may be referred to as a codeword (CW). For example, a base station may transmit the CW to a terminal, and the terminal may receive the CW from the base station. If MIMO is applied, the base station may transmit one or more CWs to the terminal at the same time. The terminal may generate one HARQ response for each CW received.

When the communications between the base station and the terminal are performed using one CC, the terminal may generate a HARQ response having a size of 1 bit or 2 bits. When the communications between the base station and the terminal are performed using a plurality of CCs, the terminal may generate an encoded HARQ response by encoding HARQ responses for the plurality of CCs. The base station may inform the terminal of information on a resource used for transmitting the HARQ response (e.g., time-frequency resource information) by using an upper layer signaling procedure (e.g., radio resource control (RRC) signaling procedure) or a combination of an upper layer signaling procedure and a downlink control information (DCI) transmission procedure. The information on the resource used for transmission of the HARQ response may be a subframe index, a slot index, a sub-slot index, a mini-slot index, or a symbol index. The terminal may transmit the HARQ response using the resource indicated by the base station.

Here, the HARQ response may be included in uplink control information (UCI), and the UCI may be transmitted through an uplink control channel (e.g., physical uplink control channel (PUCCH)). The uplink control channel may be composed of one or more consecutive symbols, and the consecutive symbols may be referred to as a 'UL slot', a 'UL sub-slot', or a 'UL mini-slot'. Also, the uplink control channel may be composed of one or more UL slots, one or more UL sub-slots, or one or more UL mini-slots. The base station may configure the uplink control channel for the terminal using an upper layer signaling procedure. The terminal may transmit the UCI using the uplink control channel. The UCI may include at least one of HARQ response, channel state information, and scheduling request (SR). Also, the terminal may transmit a buffer status report (BSR) using the uplink control channel.

Meanwhile, when a first terminal receives a downlink data channel #1 from the base station and a second terminal receives a downlink data channel #2 from the base station, transmission and reception of the uplink control channel (e.g., UCI) may be performed according to the following embodiments.

In case that the downlink data channel #1 and the downlink data channel #2 use the same time-frequency resource and a priority of data belonging to the downlink data channel #1 is lower than that of data belonging to the downlink data channel #2, the base station may not transmit a part or all of the downlink data channel #1 to the first terminal and may transmit the downlink data channel #2 to the second terminal using the time-frequency resource which is not occupied by the downlink data channel #1. In this case, the base station may transmit information (hereinafter, referred to as 'pre-emption indicator') indicating that a part or all of the resource configured for the downlink data channel #1 is used for transmission of the downlink data channel #2 to the first terminal through the downlink control channel, and the first terminal may generate UCI based on the information obtained through the downlink control channel. For example, the first terminal may identify the time-frequency resource through which the downlink data channel #1 is transmitted based on the information obtained through the downlink control channel, and generate an HARQ response for the downlink data channel #1 received through the identified time-frequency resource.

TB and Coded Block Group (CBG) Generation Scheme

A TB may be generated by a medium access control (MAC) layer of the base station when downlink transmission is performed, and a TB may be generated by a MAC layer of the terminal when uplink transmission is performed.

Figure 3:
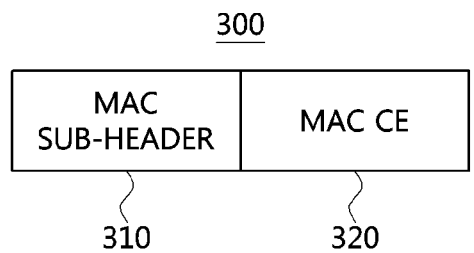
FIG. 3 is a block diagram illustrating a first embodiment of a TB in a communication system.

FIG. 3 is a block diagram illustrating a first embodiment of a TB in a communication system.

Referring to FIG. 3, a TB 300 may comprise a MAC sub-header 310 and a MAC control element (CE) 320. The TB 300 including the MAC sub-header 310 and the MAC CE 320 may be referred to as a 'type-1 TB'. The MAC sub-header 310 may be concatenated to the MAC CE 320. The TB 300 may include a MAC header in place of the MAC sub-header 310. That is, the TB 300 may include the MAC header and the MAC CE 320.

Figure 4:
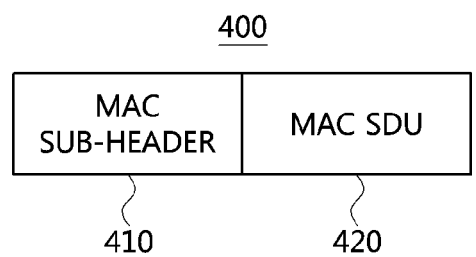
FIG. 4 is a block diagram illustrating a second embodiment of a TB in a communication system.

FIG. 4 is a block diagram illustrating a second embodiment of a TB in a communication system.

Referring to FIG. 4, a TB 400 may comprise a MAC sub-header 410 and a MAC service data unit (SDU) 420. The TB 400 including the MAC sub-header 410 and the MAC SDU 420 may be referred to as a 'type-2 TB'. The MAC sub-header 410 may be concatenated to the MAC SDU 420. The TB 400 may include a MAC header in place of the MAC sub-header 410. That is, the TB 400 may include the MAC header and the MAC SDU 420.

Meanwhile, one TB may be segmented into a plurality of CBGs. Each CBG may include one or more coded blocks (CBs). For example, the MAC layer may divide the TB into a plurality of CBGs, and may append a cyclic redundancy check (CRC) field to each CBG. The CBG may be generated according to the size of the TB. If the size of the TB is larger than a predefined size (e.g., a size defined in the 3GPP technical specification (TS)), the TB may be divided into one or more CBGs. Also, filler bits may be appended to the CBG as needed. If the size of the TB is smaller than the predefined size (e.g., the size defined in the 3GPP TS), the TB may include only one CBG. That is, one TB may be configured with one CBG. In this case, a CRC field for the TB may be generated instead of the CRC field for the CBG.

Since the number of CBGs constituting the TB varies depending on the size of the TB, the number of HARQ responses may also be variable. For example, when an HARQ response is generated for each CBG, the number of HARQ responses may increase as the number of CBGs increases. Since the terminal knows the size of the TB based on downlink scheduling information, the terminal knows the number of HARQ responses for the TB. In a communication system supporting CA or time division duplex (TDD), a terminal may generate a plurality of HARQ responses according to a plurality of downlink scheduling information. The number of HARQ responses generated by the terminal may vary depending on the number of discontinuous transmissions (DTXs).

Meanwhile, as another method of generating the CBG, the base station may inform the terminal of the number of CBGs through an upper layer signaling procedure. In this case, the terminal may generate CBGs as many as the number of CBGs indicated by the base station. Therefore, the number of CBGs may be maintained constant regardless of the size of TB, and the number of HARQ responses may not be changed since the number of CBGs is maintained constant. The number of CBs belonging to the CBG may be varied in order to maintain the number of CBGs constant even when the size of the TB is different. For example, when the size of TB is small, the number of CBs constituting one CBG may decrease, and when the size of TB is large, the number of CBs constituting one CBG may increase.

If the size of TB is small, the number of CBGs needs not to be large. For example, since the size of TB for system information is not large and the system information is transmitted from the base station in a broadcast manner, it may be necessary for the terminals to determine the number of CBGs in a uniform manner. In this case, the number of CBGs may not be configured by the upper layer signaling procedure. The base station may schedule a downlink data channel using a specific DCI format. The terminal, which has received the specific DCI format, may determine the number of CBGs according to the size of TB indicated by the specific DCI format. Accordingly, the terminal may generate CBGs as many as the number of CBGs determined by the specific DCI format.

The above-described downlink (or uplink) data channel #1 may be configured with one or more CBGs, and the one or more CBGs belonging to the downlink (or, uplink) data channel #1 may be preempted by the downlink (or uplink) data channel #2. When a retransmission procedure of the downlink (or uplink) data channel #1 is performed, a retransmission procedure for a part or all of the CBGs belonging to the downlink (or uplink) data channel #1 may be performed. When a part of the CBGs belonging to the downlink (or uplink) data channel #1 are retransmitted, the number of CBGs retransmitted may be greater than the number of CBGs preempted by the downlink (or uplink) data channel #2. This is because the CBG belonging to the downlink (or uplink) data channel #1 may be mapped to a plurality of mini-slots if a single CBG can be mapped to resource elements (REs) of a plurality of mini-slots even when the downlink (or uplink) data channel #2 is transmitted through one mini-slot.

Meanwhile, as another method of generating the CBG, the CBG may be generated based on the size of TB as well as a RE mapping scheme considering boundaries of the mini-slots. If the CBG is generated in type-1 TB units, type-2 TB units, or (type-1 TB+type-2 TB) units, the CBG may be mapped to REs to fit the boundaries of the mini-slots. In this case, the MAC layer may map one CBG to one or more mini-slots. Alternatively, the MAC layer may map a plurality of CBGs to one mini-slot. If the base station configures the mini-slot of the downlink (or uplink) data channel #2 with a relatively small number of symbols, the CBG may be generated in units of minimum mini-slot (e.g., one symbol unit). Alternatively, the CBG may be generated in consideration of the boundaries of one or more mini-slots instead of the minimum mini-slot. When the CBG is generated in units of the minimum mini-slot and only one terminal transmits and receives the uplink (or downlink) data channel #2 to and from the base station by using only one symbol, other terminals belonging to the corresponding base station may also generate CBGs in units of a symbol. In order to reduce this overhead, the MAC layer may map the CBG to fit the boundaries of one or more mini-slots.

A separate MAC header may not be generated in the TB in order to improve the processing speed in a MAC layer of a receiving end and to reduce an overhead of a soft buffer in a PHY layer of the receiving end, the TB may be generated based on the type-1 TB and the type-2 TB. The scheme of generating the separate MAC header may be a method of respectively attaching CRC fields to the TB and the CBGs belonging to the TB. In this case, since the MAC layer can report a success of reception of the TB to an upper layer (e.g., an internet protocol (IP) layer) only when the CRC for the received TB is verified, the MAC layer may store the received signals in the soft buffer until CRCs of all of the CBGs are successfully verified. In case that a retransmission is allowed independently for each CBG, each CBG whose CRC is successfully verified may be stored in the soft buffer. Since the overhead increases when the CBG whose CRC is verified is stored in the soft buffer, the CRC-verified CBG may be reported to the MAC layer. In order to support such the function, the CRC field for the TB may be omitted and only the CRC fields for the CBGs may be generated.

A TB that does not include a separate MAC header may be generated, and the TB may be divided into one or more CBGs. If the CRC-verified CBG is reported to the MAC layer, the CRC-verified CBG may not be stored in the soft buffer, and the retransmission procedure may be performed in CBG units until the CRC for the TB is verified by the reception of the MAC header. The TB may be obtained by sequentially rearranging the CBG received by the retransmission procedure.

The generated TB according to the embodiments described above may be as follows.

Figure 5:
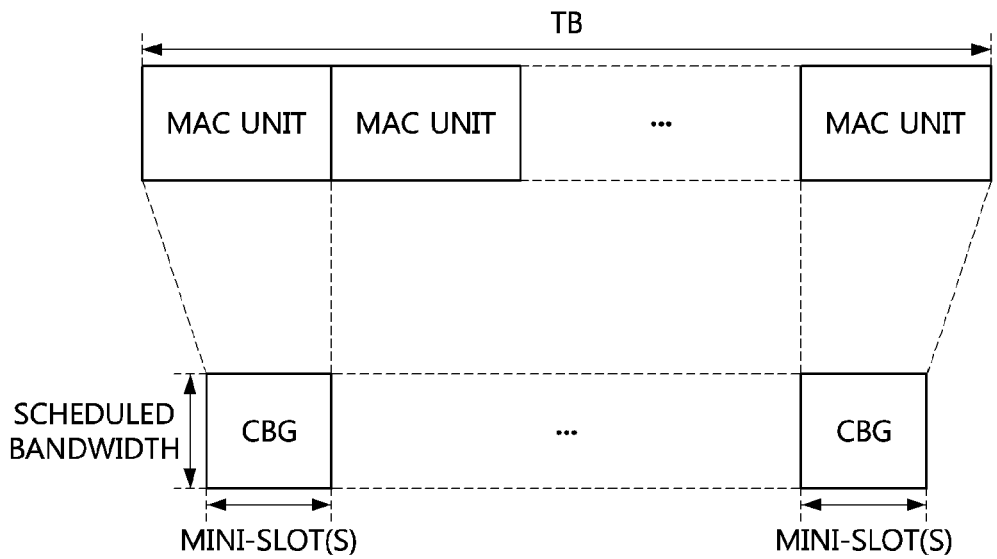
FIG. 5 is a block diagram illustrating a third embodiment of a TB in a communication system.

FIG. 5 is a block diagram illustrating a third embodiment of a TB in a communication system.

Referring to FIG. 5, a TB may include a plurality of MAC units. Each of the plurality of MAC units may be the type-1 TB shown in FIG. 3 or the type-2 TB shown in FIG. 4. One MAC unit may include one or more CBGs, and one CBG may be mapped to one or more mini-slots. In this case, one CBG may be mapped to REs to fit the boundaries of one or more min-slots. Also, the CBG may be mapped in the scheduled bandwidth.

When the CRC field and the MAC header for the TB are configured, the CRC field of the TB may be located in the foremost region or the backmost region within the TB, and the MAC header of the TB may be located in the foremost region or the backmost within the TB. The CRC field of the TB may be derived by the MAC header and the payload.

Control Information Transmission Scheme

The base station may transmit the MAC CE using the downlink data channel to transmit the control information used in the MAC layer. Also, the terminal may transmit the MAC CE using the uplink data channel to transmit the control information used in the MAC layer. The control information may belong to the TB and may be involved in the generation of the CBG. On the other hand, the transmission resources for the control information used in the physical layer may be allocated by a scheduler instead of the MAC layer of the base station. Therefore, the control information used in the physical layer may be transmitted through the downlink control channel or the uplink control channel.

When a transmission capacity of the control channel is limited and the amount of control information is large, the control information used in the physical layer may be transmitted through the data channel. Therefore, it may be necessary to define the control information transmitted through the data channel without involvement of the MAC layer. For example, the control information transmitted through the data channel without involvement of the MAC layer may include activation or deactivation information of aperiodic channel state information-reference signal (CSI-RS), management information of beam correspondence, activation or deactivation information of a bandwidth part (BWP), the size of a physical resource block (PRB) bundle of the downlink control channel, resource information for interference measurement, an reference signal received power (RSRP) of a virtual sector (e.g., beam), a channel state indicator (CSI) (e.g., a channel quality indicator (CQI)), a precoding matrix indicator (PMI), a rank indicator (RI), a CSI-RS resource indicator (CRI), or the like. These control information may be referred to as 'L1 control information', a plurality of DCI types may be defined according to the type of L1 control information included in the DCI, and a plurality of UCI types may be defined according to the type of L1 control information included in the UCI. Also, in the following embodiments, the L1 control information may be used in the same meaning as the DCI type (or the UCI type). For example, the L1 control information may indicate the DCI type or the UCI type, and the DCI type or the UCI type may refer to the L1 control information.

When a resource allocation operation for the terminal is performed, the scheduler of the base station may inform the terminal of resources occupied by TBs or CBGs for the data channel using the DCI. Also, the scheduler of the base station may allocate resources for transmission of the L1 control information in the resources for the data channel, and inform the terminal of information on the resources allocated for the L1 control information. Alternatively, the base station may transmit a DCI type to the terminal without requesting resource allocation of data channel for the terminal, and may request the terminal to transmit a UCI type.

The modulation order and the coding rate for the L1 control information may be defined in the 3GPP TS. Alternatively, the base station may transmit a DCI indicating the modulation order and coding rate for the L1 control information to the terminal. For example, the modulation order of the L1 control information may be quadrature phase shift keying (QPSK), and the coding rate of the L1 control information may indicated by an offset value relative to the coding rate of the data channel scheduled by the DCI.

The base station may inform the terminal of a DCI type (or, UCI type) together with the resource allocation information of the data channel using the DCI. The size of the L1 control information may be defined in the 3GPP TS. Alternatively, the base station may inform the terminal of the size of the L1 control information through an upper layer signaling procedure. Therefore, the terminal identify the resources allocated for the L1 control information in the resources configured for the data channel based on the type of the L1 control information, the modulation order and coding rate of the L1 control information, etc. identified based on the DCI type and the UCI type. In this case, the terminal may perform an RE demapping operation on the DCI type in the identified resources, and may perform an RE mapping operation on the UCI type in the identified resources. The RE mapping operation and a rate matching operation for the data channel may be performed based on resources not occupied by the L1 control information among the resources allocated for the data channel.

When the L control information is mapped to REs together with the data channel, a method for minimizing errors in the base station or the terminal may be required. In order to minimize reception errors of the L1 control information, the L1 control information may be mapped near RS (e.g., demodulation-reference signal (DM-RS)) to obtain a frequency multiplexing gain as in the following embodiments.

Figure 6A:
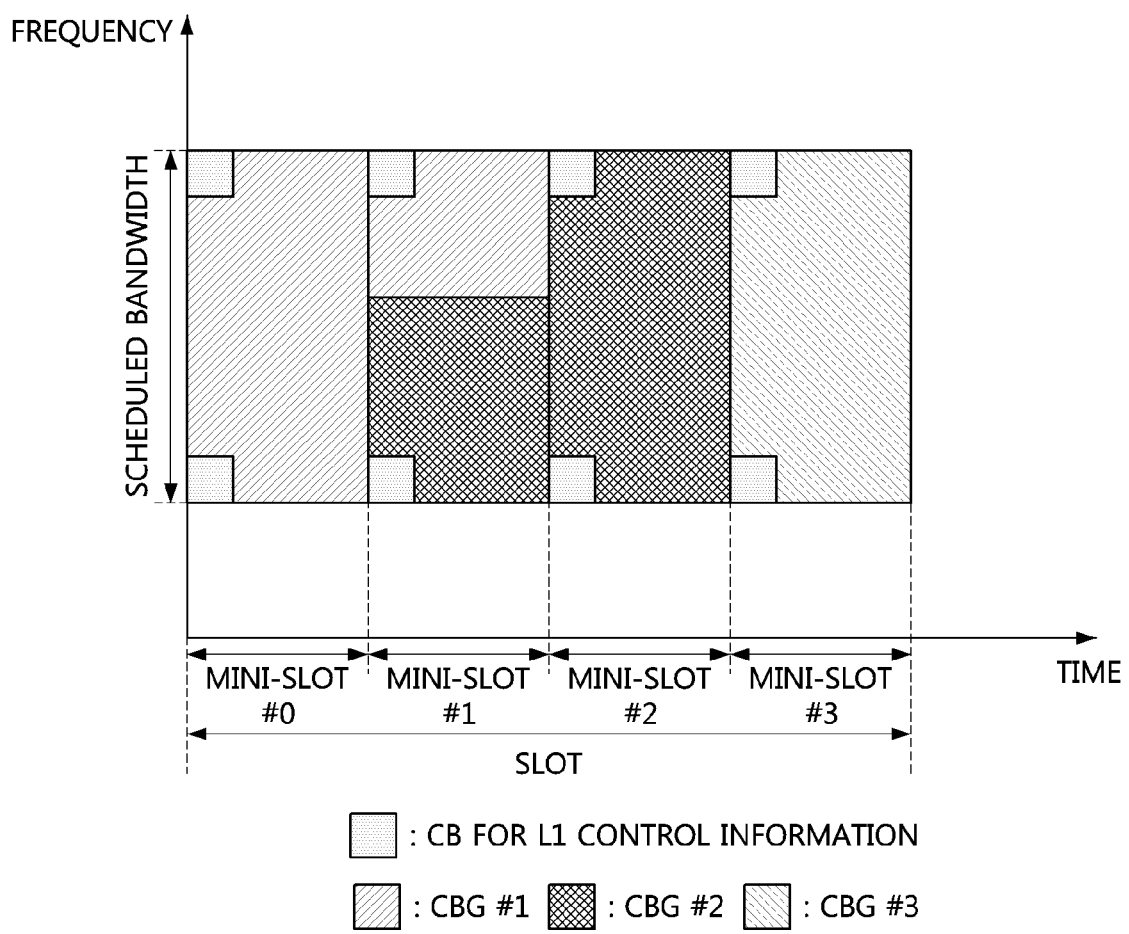
FIG. 6A is a conceptual diagram illustrating a first embodiment of a method of mapping L1 control information.
Figure 6B:
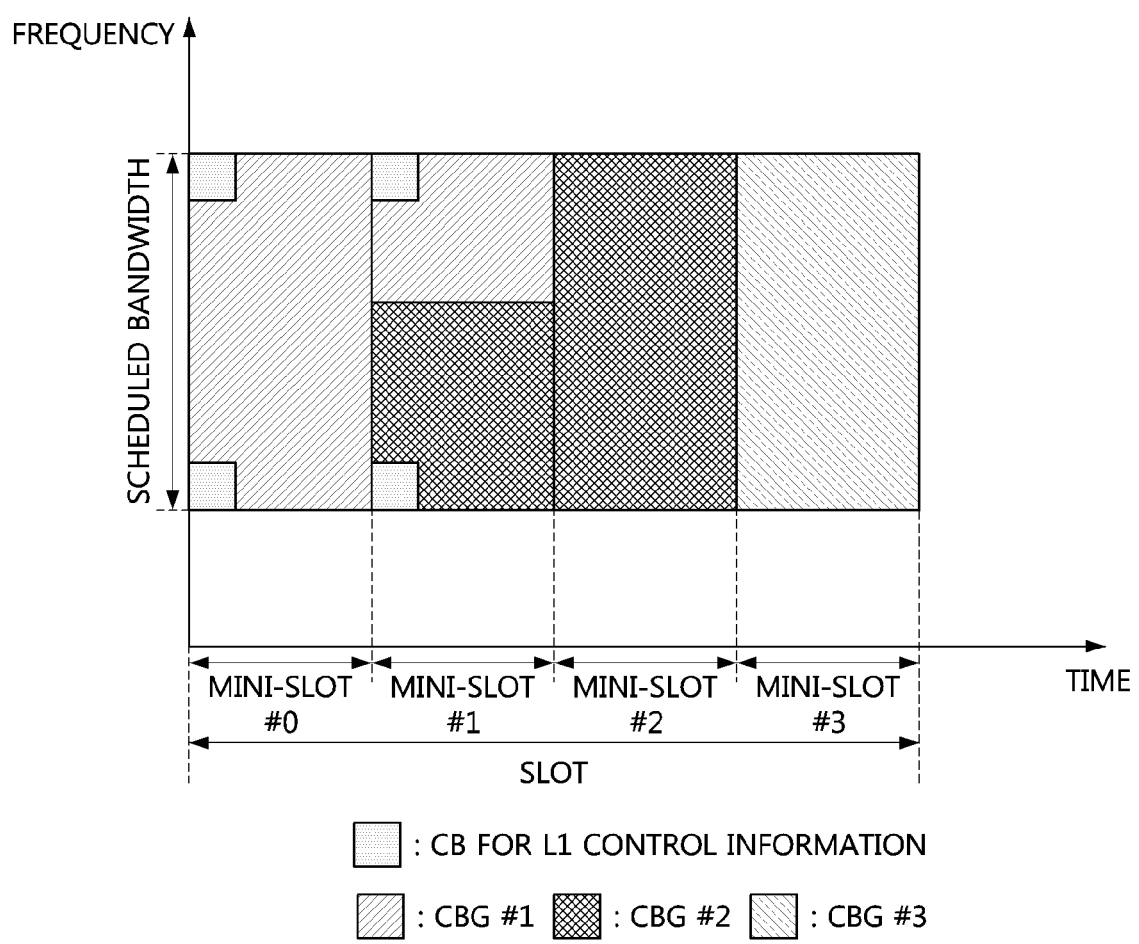
FIG. 6B is a conceptual diagram illustrating a second embodiment of a method of mapping L1 control information.

FIG. 6A is a conceptual diagram illustrating a first embodiment of a method of mapping L1 control information, and FIG. 6B is a conceptual diagram illustrating a second embodiment of a method of mapping L1 control information.

Referring to FIGS. 6A and 6B, one slot may include four mini-slots and may be used for downlink transmission or uplink transmission. The CBGs #1 to #3 may belong to the data channel and may be configured within the scheduled bandwidth. In FIG. 6A, CBs for the L1 control information may be mapped to all mini-slots belonging to one slot, and the CBs for the L1 control information may be mapped to REs adjacent to the RS (e.g., DM-RS). In FIG. 6B, CBs for the L1 control information may be mapped to some mini-slots, and the CBs for the L1 control information may be mapped to REs adjacent to the RS (e.g., DM-RS).

If the CBs for the L1 control information are mapped to REs adjacent to the DM-RS for the data channel, errors due to a channel interpolation operation after channel estimation may be reduced. In a communication system supporting MIMO that transmits two or more layers, the RE mapping scheme of the L1 control information described above may be applied. For example, the L1 control information may be mapped to REs only in one layer. In this case, the base station may inform the terminal of the layer to which the L1 control information is mapped by using the DCI including the resource allocation information of the data channel. Therefore, the terminal receiving the DCI may identify the layer to which the L1 control information is mapped, and may perform RE demapping or mapping operations on the L1 control information in the identified layer. Alternatively, the base station may inform the terminal of information on a port of the layer to which the L control information is mapped by using the DCI. The terminal may change the layer according to instruction of the base station, so that a spatial diversity gain can be obtained.

Alternatively, the L1 control information may be mapped to all layers through which the data channel is transmitted. In this case, since the available resources for transmission of the data channel are reduced, the coding rate of the data channel may be increased. Thus, the base station may determine the size of the resources allocated for the data channel in order to maintain a proper coding rate.

The reception errors of the L1 control information may be reduced by acquiring the frequency diversity gain. Thus, the L1 control information may be transmitted through two or more frequency resources (e.g., frequency bands, subcarriers) within the scheduled bandwidth for the data channel.

RE Mapping Scheme According to Type of L1 Control Information (e.g., DCI Type or UCI Type)

Each of the DCI types may have a different priority, and each of the UCI types may also have a different priority. Therefore, the position of the mapped REs may be changed according to the priority of the DCI type or the UCI type.

If the size and position of the resources occupied by the L1 control information are the same in the scheduled resource for the data channel, a DCI type (or UCI type) having the highest priority may be mapped to REs first, and then a DCI type (or UCI type) having a relatively low priority may be mapped to REs. In this case, since the DCI type (or UCI type) having a high priority may be mapped to REs close to RS (e.g., DM-RS), reception errors of the DCI type (or UCI type) having the high priority can be reduced.

On the other hand, if the L1 control information is allocated only to REs close to the RSs, and there is no data to be transmitted, since no signal is transmitted through the REs other than the REs to which the RS and the L1 control information are allocated, resource utilization may be reduced. In order to solve this problem, the L1 control information having a relatively low priority as in the following embodiments may be mapped to REs other than the REs close to the RS.

Figure 7A:
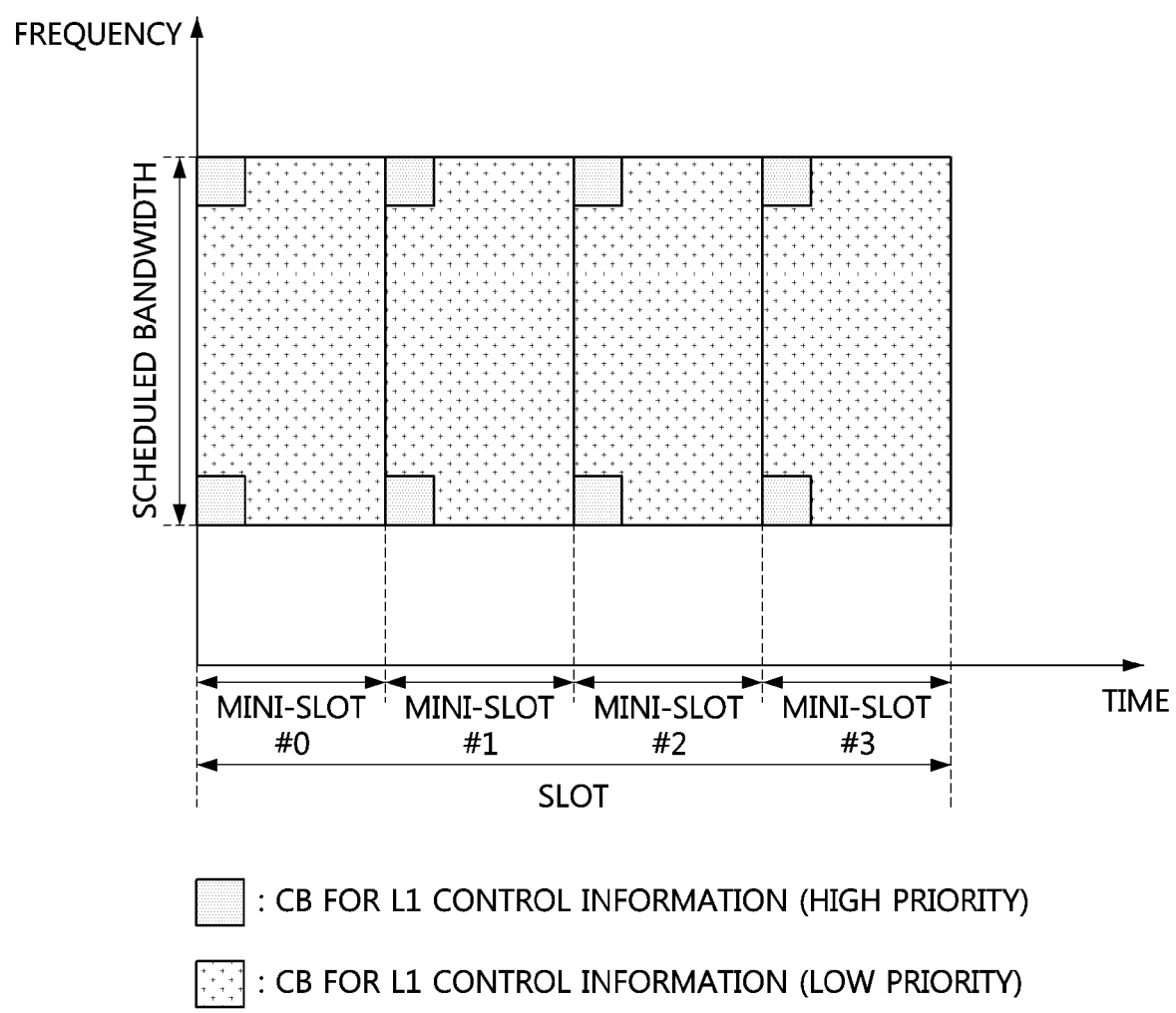
FIG. 7A is a conceptual diagram illustrating a third embodiment of a method of mapping L1 control information.

FIG. 7A is a conceptual diagram illustrating a third embodiment of a method of mapping L1 control information, and FIG. 7B is a conceptual diagram illustrating a fourth embodiment of a method of mapping L1 control information.

Referring to FIGS. 7A and 7B, one slot may include four mini-slots, and a data channel may not be transmitted in one slot. In FIG. 7A, CBs for L1 control information having a high priority may be mapped to all mini-slots belonging to one slot, and may be mapped to REs adjacent to the RS (e.g., DM-RS). On the other hand, CBs for L1 control information having a low priority may be mapped to all the mini-slots belonging to one slot, and may be mapped to REs other than the REs adjacent to the RS (e.g., DM-RS).

In FIG. 7B, CBs for the high priority L1 control information may be mapped to some mini-slots, and may be mapped to REs adjacent to the RS (e.g., DM-RS). On the other hand, CBs for the low priority L1 control information may be mapped to some mini-slots, and may be mapped to REs other than REs adjacent to the RS (e.g., DM-RS).

Although the mapping methods of the L1 control information described above are described with reference to one slot or one mini-slot, the L1 control information may be mapped to REs so as to fit the boundaries of the plurality of slots or the plurality of mini-slots.

Meanwhile, when the terminal transmits aperiodic CSI to the base station, 4 UCI types (e.g., UCI type-1, UCI type-2, UCI type-3, and UCI type-4) may exist. Each of the 4 UCI types may have different priorities, and RE mapping schemes for the UCI types may vary according to the priorities. The UCI type such as RI and CRI may be mapped to REs adjacent to the DM-RS, and the UCI such as CQI and PMI may be mapped to REs other the REs adjacent to the DM-RS. That is, the L1 control information (e.g., DCI type or UCI type) having a low priority may be mapped to REs other than the REs adjacent to the DM-RS. Alternatively, when only one DCI type or UCI type exists, the L1 control information (e.g., DCI type or UCI type) may be mapped to not only the REs adjacent to the DM-RS but also the REs other than the REs adjacent to the DM-RS.

CBG-Based TB Transmission Scheme

FIG. 8 is a conceptual diagram illustrating a first embodiment of a data channel.

Referring to FIG. 8, a plurality of TBs may be configured in a system bandwidth, and each of the plurality of TBs may be configured in one slot. The TB may comprise one or more CBGs, and one CBG may be mapped to one or more mini-slots. For example, a TB #3 may contain 3 CBGs. If one slot includes four mini-slots, the CBG #1 of the TB #3 may be mapped to mini-slots #0 to #1, and the CBG #2 of the TB #3 may be mapped to mini-slots #1 to #2, and the CBG #3 of the TB #3 may be mapped to mini-slot #3. When downlink transmission is performed, the TB may be transmitted through the downlink data channel, and the slot in which the TB is configured may be referred to as a 'DL slot'. When uplink transmission is performed, the TB may be transmitted through the uplink data channel, and the slot in which the TB is configured may be referred to as a 'UL slot'.

The base station may transmit the TBs to terminals (e.g., the first terminal, the second terminal) using the downlink data channels. The downlink data channel configured for the first terminal may be referred to as 'downlink data channel #1', and the downlink data channel configured for the second terminal may be referred to as 'downlink data channel #2'. The downlink data channel may belong to one slot regardless of the slot type (e.g., DL slot, DL-centric slot, etc.), and one TB may be transmitted in one slot. Frequency hopping may be performed for each mini-slot according to an RRC configuration or a DCI by the base station.

When the resource to which the TB #3 is mapped is configured as the downlink data channel #1, the downlink data channel #2 may be transmitted through one or more mini-slots belonging to the TB #3. If the priority of the downlink data channel #2 is higher than that of the downlink data channel #1, the downlink data channel #1 may not be transmitted through some of the resources to which the TB #3 is mapped. In this case, the base station may transmit information (i.e., preemption indicator) indicating that the downlink data channel #1 is not transmitted through some of the resources configured for the downlink data channel #1 to the first terminal. That is, the preemption indicator may indicate that the downlink data channel #2 is transmitted through some of the resources configured for the downlink data channel #1.

The preemption indicator may indicate the position of the physical resource through which the downlink data channel #1 is not transmitted (i.e., the position of the physical resource through which the downlink data channel #2 is transmitted). For example, the preemption indicator may indicate time-frequency resource information of a specific slot, time-frequency resource information of one or more mini-slots within the specific slot, and the like. Here, the time resource information of the slot (or mini-slot) may be a slot index (or mini-slot index), and the frequency resource information of the slot or mini-slot may be a subcarrier index, a subband index, PRB, or the like.

The first terminal may receive the preemption indicator from the base station, and may determine that the downlink data channel #2 is transmitted through some of the resources configured for the downlink data channel #1 based on the preemption indicator. When the downlink data channel #1 is received, the first terminal may generate an HARQ response for the downlink data channel #1. The size of the HARQ response may vary depending on a rank. For example, if the rank is 1, 2, 3 or 4, the size of the HARQ response may be 1 bit. If the rank is 5, 6, 7 or 8, the size of the HARQ response may be 2 bits. The terminal may generate one HARQ response bit per TB or CBG.

HARQ Response Transmission Scheme 1 (Hereinafter, 'Scheme 1')

The base station may inform the first terminal of the number of CBGs constituting the TB. For example, the base station may inform the first terminal of the number of CBGs constituting the TB using an upper layer signaling procedure or a combination of an upper layer signaling procedure and a DCI transmission procedure. Here, the DCI may include resource allocation information of the downlink data channel #1. In the scheme 1, the preemption indicator may not be used. That is, the base station may not transmit the preemption indicator indicating the transmission of the downlink data channel #2 to the terminal. Alternatively, even when the preemption indicator indicating the transmission of the downlink data channel #2 is received from the base station, the first terminal may generate an HARQ response without considering the preemption indicator.

The first terminal may generate the HARQ response for the downlink data channel #1 in units of CBG regardless of reception of the preemption indicator. The size of the HARQ response (e.g., 1 bit or 2 bits) may vary depending on the rank. The first terminal may transmit the HARQ response to the base station using the uplink control channel. For example, if the TB #1 in FIG. 8 includes L CBGs, the TB #2 in FIG. 8 includes M CBGs, and the TB #3 in FIG. 8 includes N CBGs, the first terminal having received the TBs #1 to #3 may generate (L+M+N) HARQ responses.

In a communication system supporting MIMO, TDD, CA, or DC, the first terminal may transmit HARQ responses for a plurality of downlink data channels #1 through one uplink control channel. Here, the number of HARQ responses generated by the first terminal may correspond to the number of CBGs belonging to the plurality of downlink data channels #1.

HARQ Response Transmission Scheme 2 (Hereinafter, 'Scheme 2')

This is a scheme in which HARQ responses for punctured CBGs are not generated and transmitted. The base station may transmit the preemption indicator indicating the transmission of the downlink data channel #2 to the first terminal, and may transmit the downlink data channel #1 to the first terminal. The first terminal receiving the downlink data channel #1 may generate an HARQ response for the downlink data channel #1 in units of TB or CBG. In this case, the first terminal may generate the HARQ response in consideration of the preemption indicator received from the base station.

Specifically, the first terminal may generate the HARQ response for the downlink data channel #1 on a CBG basis in the resource (e.g., slot, mini-slot) indicated by the preemption indicator. On the other hand, the first terminal may generate the HARQ response for the downlink data channel #1 on a TB basis in a resource other than the resource indicated by the preemption indicator. The first terminal may transmit the generated HARQ response to the base station through the uplink control channel corresponding to the downlink data channel #1.

For example, if the TB #1 in FIG. 8 includes L CBGs, the TB #2 in FIG. 8 includes M CBGs, and the TB #3 in FIG. 8 includes N CBGs, the first terminal having received the TBs #1 to #3 may generate a 1-bit HARQ response for the TB #1, a 1-bit HARQ response for the TB #2, and a 1-bit HARQ response for the TB #3. The first terminal may transmit the HARQ response of (1+1+1) bits to the base station through the uplink control channel. Here, since the first terminal does not know transmission related information (e.g., modulation order, coding rate, etc.) of the downlink data channel #2, the first terminal may consider only the received downlink data channel #1, and demodulate the CBGs for the downlink data channel #1.

HARQ Response Transmission Scheme 3 (Hereinafter, 'Scheme 3')

This is a scheme in which granularity of HARQ responses for punctured CBGs is considered. The base station may transmit the preemption indicator indicating the transmission of the downlink data channel #2 to the first terminal, and may transmit the downlink data channel #1 to the first terminal. The first terminal receiving the downlink data channel #1 may generate an HARQ response for the downlink data channel #1 in units of TB or CBG. In this case, the first terminal may generate the HARQ response in consideration of the preemption indicator received from the base station.

Specifically, the first terminal may divide TBs received in a slot indicated by the preemption indicator into a plurality of CBGs, and may generate an HARQ response of each of the plurality of CBGs. For example, if the TB #1 in FIG. 8 includes L CBGs, the TB #2 in FIG. 8 includes M CBGs, the TB #3 in FIG. 8 includes N CBGs, and the preemption indicator indicates the slot #2, the first terminal having received the TBs #1 to #3 may generate an 1-bit HARQ response for the TB #1, an M-bit HARQ response for the TB #2, and an 1-bit HARQ response for the TB #3. The first terminal may transmit the HARQ response of (1+M+1) bits to the base station through the uplink control channel.

Meanwhile, a transmission scheme of HARQ response may vary depending on specificity of information indicated by the preemption indicator.

HARQ response transmission scheme 4 (hereinafter, 'Scheme 4') This is a scheme in which an HARQ response for the CBG indicated by the preemption indicator is not generated and transmitted. When the preemption indicator indicates the slot #2 in FIG. 8, the first terminal may not generate HARQ responses for the CBGs belonging to the downlink data channel #1 received in the slot #2 (i.e., Scheme 4). In case of Scheme 4, HARQ responses for the CBGs received through the slot #2 in FIG. 8 may not be transmitted.

Also, in Scheme 4, the downlink data channel #1 received through the slot #2 in FIG. 8 may include 3 CBGs, initially-transmitted 3 CBGs may not be stored in the buffer, and HARQ combining for retransmitted 3 CBGs may not be performed. The above-described operation may be applied when the downlink data channel #1 is allocated by the DCI or when the downlink data channel #1 is allocated by the L1 activation. The first terminal does not transmit a part or all of the uplink control channel including only the HARQ response bit indicating NACK, thereby not interfering with other terminals. Also, when the size of a HARQ codebook (e.g., HARQ ACK codebook) used in the communication system supporting TDD, CA, or DC decreases, reception quality of the uplink control channel can be improved.

HARQ Response Transmission Scheme 5 (Hereinafter, 'Scheme 5')

A fixed HARQ response (e.g., NACK or ACK) may be generated and transmitted as the HARQ response for the CBG indicated by the preemption indicator. Alternatively, when the preemption indicator indicates the slot #2 in FIG. 8, the first terminal may generate a fixed HARQ response (e.g., NACK or ACK) as the HARQ response for the CBGs belonging to the downlink data channel #1 received through the slot #2 (i.e., scheme 5). In case of Scheme 5, a NACK may be transmitted as the HARQ response for the CBGs received via the slot #2 in FIG. 8.

It may be overhead to transmit the NACK for the CBGs indicated by the preemption indicator, but the base station receiving the NACK from the first terminal may determine that the preemption indicator has been successfully received at the first terminal. An HARQ combining method in Scheme 5 may be the same as the HARQ combining method in Scheme 4.

When the first terminal that performs communications using one carrier transmits 1-bit UCI on the uplink control channel (e.g., in case that the PUCCH formats 1, 1a, and 1b in the LTE communication system are considered), the first terminal using Scheme 4 may not transmit the uplink control channel, and the first terminal using Scheme 5 may transmit the NACK through the uplink control channel. In the communication system supporting TDD, CA, or DC, when the first terminal transmits UCI of 2 bits or more through the uplink control channel, the first terminal using the scheme may encode the HARQ response bits indicating the NACK, and map the encoded HARQ response bits to the uplink control channel.

Meanwhile, the preemption indicator may be a bitmap indicating a resource through which the downlink data channel #2 is transmitted. The bitmap may indicate at least one of time resources (e.g., slots, mini-slots, symbols, etc.) and frequency resources (e.g., subbands, subcarriers, etc.). For example, if the preemption indicator indicates the slot #2 and (0, 0, 1, 0) in FIG. 8, (0, 0, 1, 0) may represent mini-slots #0 to #3 belonging to the slot #2, and the downlink data channel #2 may be transmitted in the mini-slot #2 indicated by '1' in (0, 0, 1, 0).

The first terminal receiving the preemption indicator may determine that the CBG (e.g., CBG #2) received in the mini-slot #2 of the slot #2 is the downlink data channel #2. When the CBG #1 is received in the mini-slots #0 to #1 of the slot #2, the first terminal may generate an HARQ response for the CBG #1. When the CBG #3 is received in the mini-slot #3 of the slot #2, the first terminal may generate an HARQ response for the CBG #3. The first terminal may not generate an HARQ response for the CBG #2 received in the mini-slot #2 of the slot #2 (i.e., Scheme 4). Alternatively, the first terminal may generate a fixed HARQ response (e.g., NACK or ACK) as the HARQ response for the CBG #2 received in the mini-slot #2 of the slot #2 (i.e., Scheme 5).

The first terminal may transmit HARQ responses for the CBGs received through the slot #2 to the base station through the uplink control channel. In case of Scheme 4, the first terminal may transmit (the HARQ response for the CBG #1+the HARQ response for the CBG #3) to the base station. In case of Scheme 5, the first terminal may transmit (the HARQ response for the CBG #1+the fixed HARQ response for the CBG #2+the HARQ response for the CBG #3) to the base station.

If the CBG #2 is initially-transmitted data, the terminal may not store the CBG #2 in the buffer. If the CBG #2 is retransmitted data, the terminal may not perform HARQ combining on the CBG #2 already stored in the buffer and the retransmitted CBG #2. If the HARQ response for the CBG #2 is generated in Scheme 4, the transmission time point at which the HARQ response for the CBG #2 may be different from the transmission time point at which the HARQ responses for the CBGs #1 and #3. The transmission time point of the HARQ response for the CBG #2 may be set based on the DCI indicating the retransmission of the CBG #2.

HARQ Response Transmission Scheme 6 (Hereinafter, 'Scheme 6')

HARQ responses for CBGs other than the CBGs indicated by the preemption indicator among the CBGs belonging to the TB may be transmitted in a bundling manner. When a fixed HARQ response for the CBG #2 is generated in Scheme 5, the fixed HARQ response may be transmitted at a predefined time. In case of Scheme 6, the first terminal may generate one HARQ response by performing a logical AND operation on the HARQ response for the CBG #1 and the HARQ response for the CBG #3, and transmit the generated one HARQ response (i.e., the bundled HARQ response) to the base station through the uplink control channel.

According to Scheme 6, even when the first terminal does not receive the preemption indicator, the size of the HARQ response codebook may be maintained. Also, the first terminal may transmit 1-bit or 2-bit UCI through the uplink control channel allocated by the base station, thereby reporting results of decoding on the CBG #1 and the CBG #3 other than the CBG #2 to the base station.

If the fixed HARQ response for the CBG #2 is a NACK and the base station receives an ACK from the first terminal, the base station may determine that the HARQ responses for the CBGs #1 and #3 are both ACK. On the other hand, when a NACK is received from the first terminal, the base station may not be able to distinguish the CBG whose HARQ response is a NACK. The base station may receive the HARQ response for the CBG #2 at a transmission time different from the transmission time of the HARQ responses of the CBGs #1 and #3. The transmission time point of the HARQ response for the CBG #2 may be set based on the DCI indicating the retransmission of the CBG #2.

Meanwhile, the preemption indicator may include the slot #2 of FIG. 8, a bitmap (i.e., 0, 0, 1, 0) indicating the mini-slots belonging to the slot #2, and frequency resource information. In this case, the first terminal may identity a collision between the downlink data channel #1 (e.g., CBGs belonging to the downlink data channel #1) and the downlink data channel #2 (e.g., CBGs belonging to the downlink data channel #2) based on the information included in the preemption indicator.

If the collided CBG is initially-transmitted data, the first terminal may not store the CBG in the buffer. Alternatively, if the collided CBG is retransmitted data, the first terminal may not perform HARQ combining on the CBG. Also, the first terminal may not generate an HARQ response for the collided CBG. On the other hand, if the non-collided CBG is initially-transmitted data, the first terminal may store the CBG in the buffer. Alternatively, if the non-collided CBG is retransmitted data, the first terminal may perform HARQ combining on the CBG. Also, the first terminal may generate an HARQ response for the non-collided CBG.

In case that a specific CBG transmitted from the base station is not received by the first terminal through the downlink data channel #2 and it is not necessary to decode the specific CBG, Schemes 4, 5, or 6 may be used. In Scheme 4, if the specific CBG is initially-transmitted data, the first terminal may store the specific CBG in the buffer. On the other hand, in Scheme 4, if the specific CBG is retransmitted data, the first terminal may not perform HARQ combining on the specific CBG. Also, the first terminal may not generate an HARQ response for the specific CBG.

In Scheme 5, the first terminal may generate a fixed HARQ response for the specific CBG. If the specific CBG is initially-transmitted data, the first terminal may not store the specific CBG in the buffer. If the specific CBG is retransmitted data, the first terminal may not perform HARQ combining on the specific CBG.

In Scheme 6, the first terminal may generate one HARQ response by performing a logical AND operation on HARQ responses of CBGs other than the specific CBG among all the CBGs belonging to the TB. If the specific CBG is initially-transmitted data, the first terminal may not store the specific CBG in the buffer. If the specific CBG is retransmitted data, the first terminal may not perform HARQ combining on the specific CBG. The base station may receive the HARQ response of the CBG #2 at a transmission time different from the transmission time of the HARQ responses for the CBGs #1 and #3. The transmission time point of the HARQ response for the CBG #2 may be set based on the DCI indicating the retransmission of the CBG #2.

Meanwhile, control information (hereinafter, 'collision CBG index') indicating the CBG belonging to the downlink data channel #1, which collides with the downlink data channel #2, may be transmitted through the downlink control channel. The control information indicating the collided CBG may be distinguished from the preemption indicator and the DCI indicating the retransmission of the specific CBG. When the control information indicating the collided CBG (i.e., the CBG #2) is received, the first terminal may generate HARQ responses by performing a decoding operation on the CBGs #1 and #3, and may not perform a decoding operation on the CBG #2. In this case, Scheme 4, 5 or 6 may be used. If the CBG corresponding to the collision CBG index is initially-transmitted data, the first terminal may not store the CBG in the buffer. Alternatively, if the CBG corresponding to the collision CBG index is retransmitted data, the first terminal may not perform HARQ combining on the CBG.

In Scheme 4, the first terminal may not generate an HARQ response for the CBG corresponding to the collision CBG index. In Scheme 5, the first terminal may generate a fixed HARQ response as the HARQ response to the CBG corresponding to the collision CBG index. In Scheme 6, the first terminal may generate one HARQ response by performing a logical AND operation on HARQ responses for CBGs other than the CBG corresponding to the collision CBG index among all the CBGs belonging to the TB. The base station may receive the HARQ response for the CBG #2 at a transmission time different from the transmission time of the HARQ responses for the CBGs #1 and #3. The transmission time point of the HARQ response for the CBG #2 may be set based on the DCI indicating the retransmission of the CBG #2.

Meanwhile, when the above-described embodiments are applied to a communication system supporting CA, a base station may configure one or more CBGs for each component carrier (CC), and one or more CBGs may be transmitted through a downlink data channel. The embodiments described above may be applied not only to the communication system supporting the CA but also to the communication system supporting the TDD. In this case, a slot index may correspond to a CC index.

Figure 9:
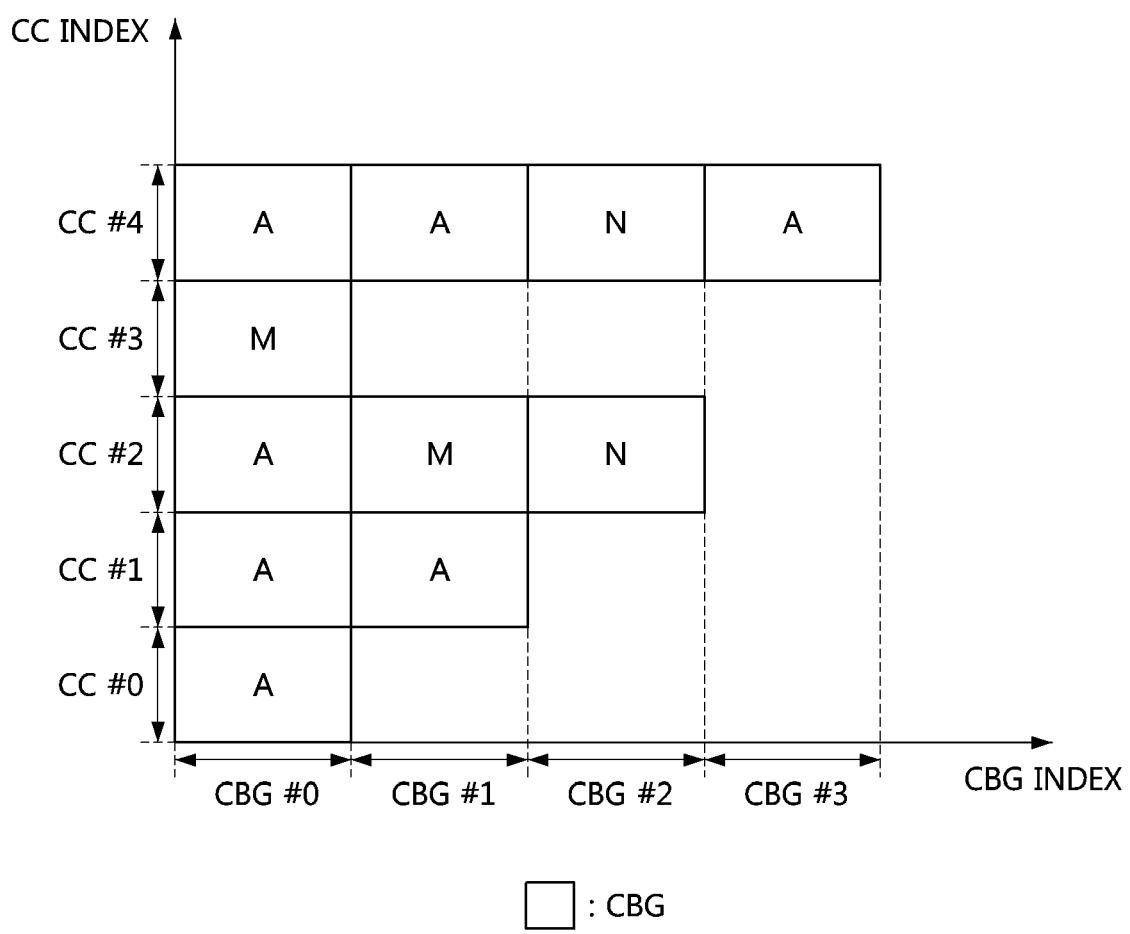
FIG. 9 is a conceptual diagram illustrating a first embodiment of an HARQ response in a communication system supporting CA.

FIG. 9 is a conceptual diagram illustrating a first embodiment of an HARQ response in a communication system supporting CA.

Referring to FIG. 9, 5 CCs (e.g., CCs #0 to #4) may be configured, one CBG may be configured in the CC #0, 2 CBGs may be configured in the CC #1, 3 CBGs may be configured in the CC #2, one CBG may be configured in the CC #3, and 4 CBGs may be configured in the CC #4. The CCs #0 to #4 may be configured by an upper layer signaling procedure or a combination of an upper layer signaling procedure and a DCI transmission procedure.

The base station may transmit 11 CBGs through the downlink data channel. Here, the CBG denoted as 'A' (i.e., ACK) may indicate the CBG successfully received at the first terminal among the CBGs received through the downlink data channel #1, and the CBG denoted as 'N' (i.e., NACK) may indicate the CBG that is not successfully received at the first terminal among the CBGs received through the downlink data channel #1. The CBG denoted as 'M' (i.e., missing) may indicate the CBG that is not transmitted through the downlink data channel #1 (e.g., the CBG whose resource is occupied by the CBG transmitted through the downlink data channel #2 and which cannot be transmitted through the downlink data channel #1). When a preemption indicator indicating the CBGs denoted as 'M' is received from the base station, the first terminal may distinguish the CBGs indicated by M. The reason for the failure of the first terminal to decode the downlink control channel #1 to which the corresponding CBG is assigned is that the downlink control channel #1 has not been transmitted from the base station and some of the CBGs belonging to the downlink data channel #1 are preempted due to the transmission the downlink channel #2.

Figure 10:
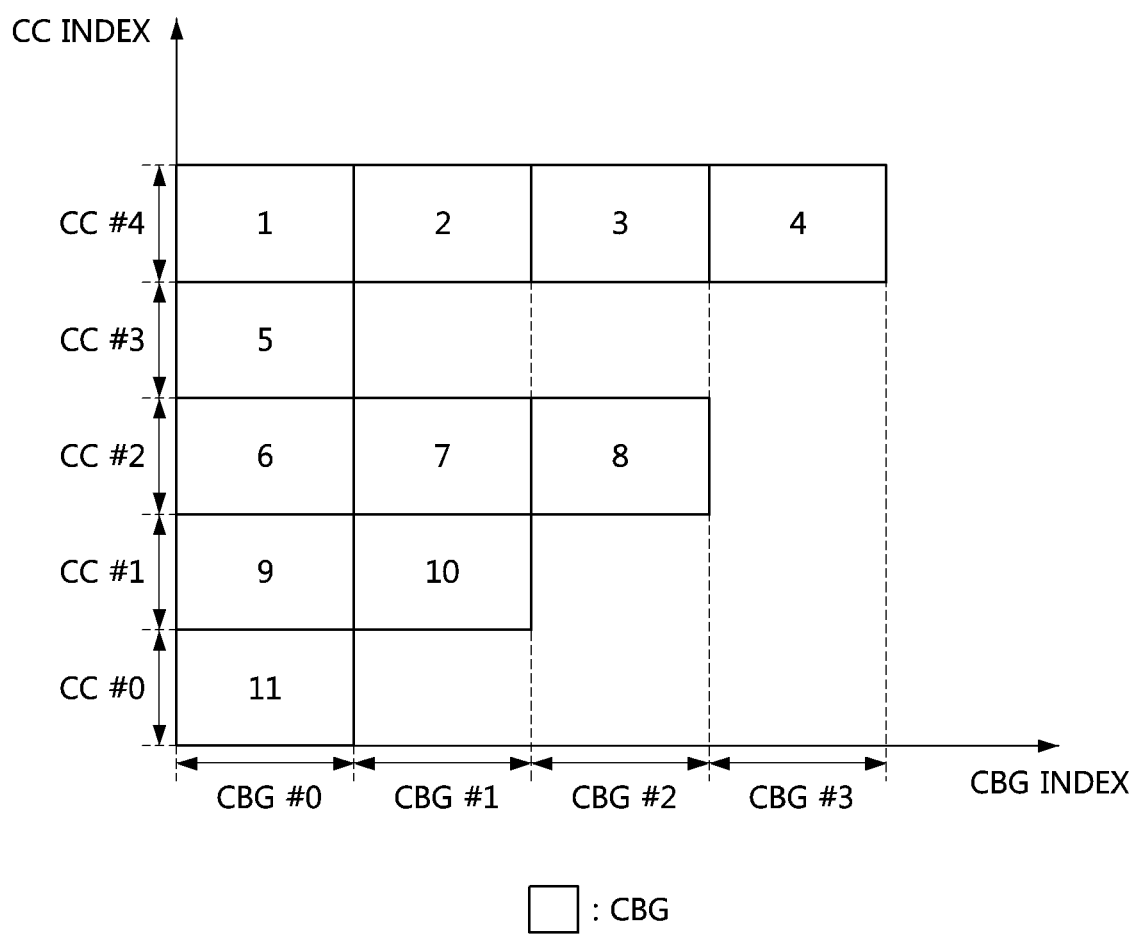
FIG. 10 is a conceptual diagram illustrating a first embodiment of an HARQ response codebook in a communication system supporting CA.
Figure 11:
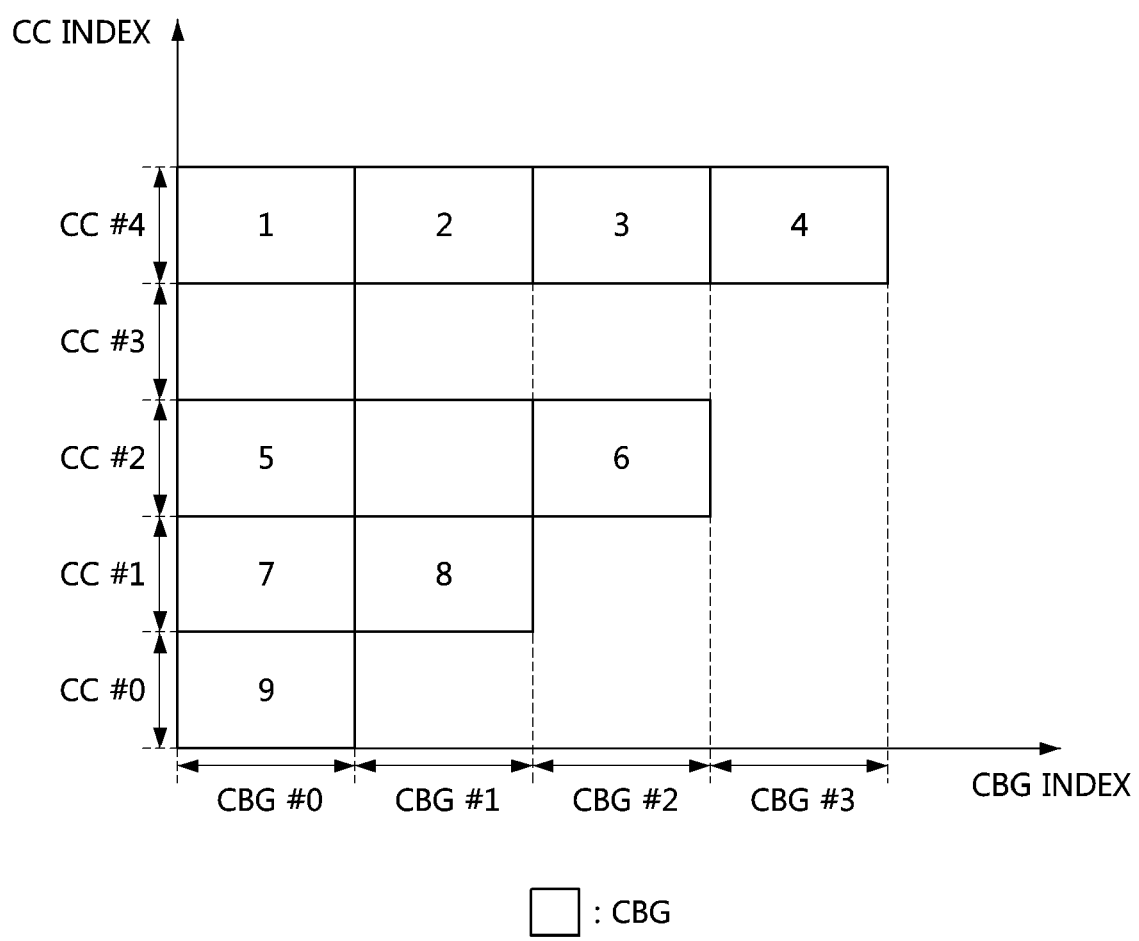
FIG. 11 is a conceptual diagram illustrating a second embodiment of an HARQ response codebook in a communication system supporting CA.

FIG. 10 is a conceptual diagram illustrating a first embodiment of an HARQ response codebook in a communication system supporting CA, and FIG. 11 is a conceptual diagram illustrating a second embodiment of an HARQ response codebook in a communication system supporting CA.

Referring to FIG. 10 and FIG. 11, a number denoted in each CBG may indicate a coding order of the HARQ response for the corresponding CBG. The base station may perform a decoding operation on HARQ responses based on an HARQ response codebook corresponding to two cases according to whether or not a preemption indicator is received at the terminal. The base station may transmit a preemption indicator through each CC. Alternatively, the base station may transmit preemption indicators via one CC. In this case, the base station may perform RRC configuration for performing cross carrier scheduling for the terminal. In this case, even if the CC through the preemption indicator is received is different from the CC through which the downlink data channel is received, an HARQ response may be generated in consideration of the preemption indicator. That is, Scheme 1, 2, 3, 4, 5 or 6 may be applied.

When the terminal fails to recognize the CBG #1 of the CC #2 and the CBG #0 of the CC #3 as 'M', the terminal may generate HARQ responses by decoding the CBG #1 of the CC #2 and the CBG #0 of the CC #3. The terminal may assign a coding order to each CBG according to a predefined HARQ response codebook, and may encode an HARQ response of each CBG according to the assigned order. If the terminal fails to recognize the CBG #1 of the CC #2 and the CBG #0 of the CC #3 as 'M', a coding order of an HARQ response of each CBG may be assigned as shown in FIG. 10. Here, the unrecognized CBG may not be assigned a coding order.

The base station may transmit a downlink assignment index (DAI) to the terminal. Alternatively, the base station may inform the terminal of the size of the HARQ response codebook through an upper layer signaling procedure. Therefore, the terminal may confirm the size of the HARQ response codebook by the DAI or the upper layer signaling procedure.

On the other hand, if the CBG #1 of the CC #2 and the CBG #0 of the CC #3 are recognized as 'M', the terminal may not perform decoding operation for the CBG #1 of the CC #2 and the CBG #0 of the CC #3, and may not generate HARQ responses for the CBG #1 of the CC #2 and the CBG #0 of the CC #3. The terminal may assign coding orders to CBGs excluding the CBG #1 of the CC #2 and the CBG #0 of the CC #3 among all CBGs, and may encode HARQ responses of the CBGs according to the assigned orders. In this case, the coding orders for the HARQ responses of the CBGs may be assigned as shown in FIG. 11. Therefore, the HARQ responses for the CBG #1 of the CC #2 and the CBG #0 of the CC #3 may not be transmitted through the uplink control channel, and the terminal may encode the HARQ responses of the remaining CBGs based on the predefined HARQ response codebook.

The terminal may confirm the size of the HARQ response codebook by the DAI or the upper layer signaling procedure. However, since the decoding operation is not performed on specific CBGs (i.e., the CBG #1 of the CC #2 and the CBG #0 of the CC #3), the terminal may encode the HARQ responses by applying a size smaller than the size of the HARQ response codebook indicated by the DAI or the upper layer signaling procedure.

UCI Transmission Scheme

Next, a scenario in which an HARQ response or another downlink control channel is transmitted from a terminal to a serving base station through an uplink control channel will be described.

A case where an uplink control channel includes four or more symbols may be considered. For example, the uplink control channel may include 14 symbols corresponding to the maximum slot length. The time unit in which a terminal performs frequency hopping may vary according to configuration of a sub-slot (or mini-slot). In a communication system supporting dynamic TDD, since the slot length is variable, the serving base station may inform the terminal of the length of the uplink control channel in advance. The length of the uplink control channel may be indicated by the DCI. For example, the DCI used for scheduling the downlink data channel may include information on the length of the uplink control channel.

In another embodiment, when the serving base station transmits common control information including a slot format indicator (SFI) through a physical downlink control channel (e.g., a group-common downlink control channel), the terminal may determine the length of the uplink control channel based on the SFI. The SFI may indicate a configuration of downlink and uplink symbols in the corresponding slot. The SFI transmitted by the serving base station may indicate both a format of the current slot and a format of the future slot. For example, the serving base station may transmit common control information including k SFIs (e.g., SFI #1, SFI #2, . . . , SFI # k) to the terminal for respective slots. The k SFIs in the common control information may be concatenated.

The terminal receiving the k SFIs may determine that the SFI #1 indicates the format of the current slot # n, the slot SFI #2 indicates the format of the slot # (n+l), and the SFI # k indicates the format of the slot # (n+k). If an interval between the downlink data channel and the uplink control channel through which the HARQ response for the downlink data channel is transmitted is k, the terminal may identify the format of the slot # (n+k) in which the uplink control channel is configured based on the SFI received through the downlink data channel configured in the slot # n. The SFI may indicate the format of the slot in which the uplink data channel is configured as well as the format of the slot in which the uplink control channel is configured.

When the serving base station provides communication services to terminals having different transmission time points of uplink control channel, a plurality of SFIs for the terminals may be transmitted through the common control information. For example, when the first terminal receives the downlink data channel in the slot # n and the transmission timing of the HARQ response of the first terminal is the slot # (n+3), the first terminal should know the length of the uplink interval in the slot # (n+3). When the second terminal receives the downlink data channel in the slot # n and the transmission timing of the HARQ response of the second terminal is the slot # (n+4), the second terminal should know the length of the uplink interval in the slot # (n+4).

The minimum time required to generate an HARQ response (e.g., UCI) at the terminal may be defined in the 3GPP TS. Alternatively, the serving base station may set the minimum time required for generating an HARQ response (e.g., UCI) at the terminal in consideration of capability of the terminal.

If the minimum time required to generate an HARQ response at the first terminal is a time corresponding to 2 slots, the terminal should know the format of the slot # (n+3) (e.g., the length of the uplink interval in the slot # (n+3)) in the slot # n at the latest. In this case, the terminal may generate an HARQ response in the slots # (n+1) and # (n+2) and may transmit the generated HARQ response in the slot # (n+3). If the minimum time required to generate an HARQ response at the second terminal is a time corresponding to 1 slot, the terminal should know the format of the slot # (n+4) (e.g., the length of the uplink interval in the slot # (n+4)) in the slot # (n+2) at the latest. In this case, the terminal may generate an HARQ response in the slot # (n+3) and may transmit the generated HARQ response in the slot # (n+4). The serving base station may transmit SFIs of different slots at different time points in a broadcast manner to support UCI transmission operations of the first terminal and the second terminal. The above-described UCI transmission operation may be performed based on FIGS. 12A and 12B below.

FIG. 12A is a timing chart illustrating a first embodiment of a method of transmitting uplink control information, and FIG. 12B is a timing diagram illustrating a second embodiment of a method of transmitting uplink control information.

Referring to FIGS. 12A and 12B, the serving base station may transmit the downlink data channel and the preemption indicator to the terminal # i (i=1, 2) in the slot # n. The terminal # i may receive the downlink data channel and the preemption indicator in the slot # n, and may transmit an HARQ response for the downlink data channel in the slot # (n+k$_i$). The minimum time required for the terminal # i to generate an HARQ response (e.g., UCI) may be $\Delta_i$. Here, a temporal unit of Ai may be a slot, and Ai may correspond to 0 or more slots. In this case, the terminal # i should know the SFI of the slot # (n+k$_i$) in the slot # (n+k$_i$−$\Delta_i$) to transmit the HARQ response (e.g., UCI). Therefore, the serving base station may transmit the SFI for the terminal # i through the common control channel.

In FIG. 12A, the serving base station may identify all terminal # i having the same (n+k$_i$−$\Delta_i$), and may transmit all SFIs applied to the slot # (n+k$_i$) using a common control channel in the slot # (n+k$_i$−$\Delta_i$). Since the serving base station knows the number of terminals operating in RRC_connected state, the size of the common control channel (e.g., common control information) may be minimized by minimizing the number of SFIs. However, a reception error of the common control channel may occur. In order to solve this problem, the serving base station may transmit the common control channel using a low coding rate. Also, the serving base station may repeatedly transmit the SFIs at least twice. For example, in FIG. 12B, the serving base station may repeatedly transmit the SFIs three times. That is, SFIs for a plurality of specific slots may be transmitted through the downlink control channel, and a SFI for a specific slot in the downlink control channel may be transmitted once. For example, the SFI transmitted through the previous downlink control channel may be retransmitted through the current downlink control channel. In this case, the number of repeated transmissions of the SFI may be three as shown in FIG. 12B.

Meanwhile, a RE mapping structure of the uplink control channel may be independent of the number of symbols occupied by the uplink control channel. In the time domain, the encoding operation may be performed based on different coding rates depending on the number of symbols occupied by the uplink control channel. For example, a spreading code (e.g., orthogonal cover code (OCC)) may be defined for each symbol in the time domain. Therefore, it may be preferable to perform a coding operation in the frequency domain rather than a coding operation in the time domain. However, if the terminal knows the length of the uplink control channel, the terminal can perform not only the coding operation in the frequency domain but also the coding operation in the time domain. If information indicating that the frequency domain is to be changed dynamically is not received from the base station, the terminal may generate the uplink control channel by performing an encoding operation on the time-frequency domain configured and indicated by the base station.

Uplink Channel Transmission Scheme when a Terminal is Located at a Coverage Boundary of a Base Station The base station may inform the terminal (e.g., the terminal located at the coverage boundary of the base station) of the number of repeated transmissions of the uplink control channel (e.g., PUCCH, UCI, HARQ response) through an upper layer signaling procedure, and thus the terminal may repeatedly transmit the uplink control channel. The repetitive transmission of the uplink control channel may be configured for the PUCCH formats 1, 1a and 1b used for transmission of the HARQ response in a primary cell of the terminal. Also, the base station may configure a bundled transmission (e.g., transmission of different redundancy versions (RV) through TTI bundling) of the uplink data channel (e.g., a physical uplink shared channel (PUSCH) for the terminal (e.g., the terminal located at the coverage boundary of the base station), and thus the terminal may perform the bundled transmission for the uplink data channel.

When the terminal located at the coverage boundary of the base station requests more downlink data transmissions as compared to uplink data transmissions, the base station may allocate downlink data channels to the terminal more than the uplink data channels. In this case, since the base station cannot transmit downlink data only through downlink adaptation, frequency resources for downlink data transmission may be additionally allocated through frequency aggregation. Also, the base station may allocate more time resources for the downlink data transmissions. Therefore, HARQ responses for other downlink data may occur before the repetitive transmission of the HARQ response for the downlink data is completed, as in the following embodiment.

Figure 13:
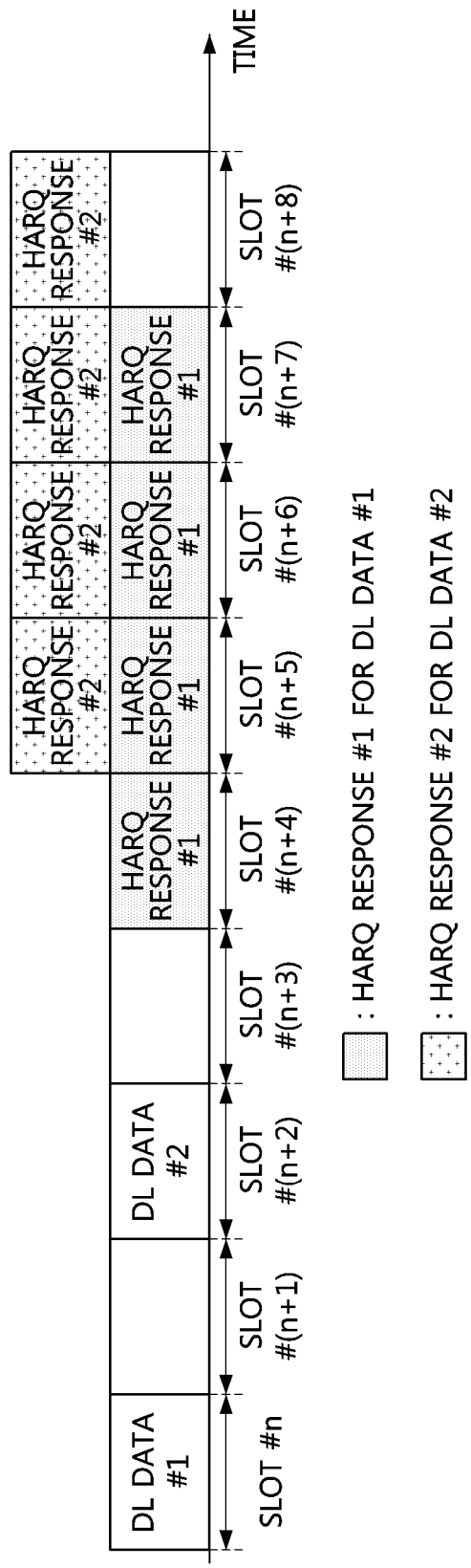
FIG. 13 is a timing diagram illustrating a first embodiment of HARQ response transmission in a communication system.

FIG. 13 is a timing diagram illustrating a first embodiment of HARQ response transmission in a communication system.

Referring to FIG. 13, a downlink data channel may be allocated by a dynamic or static scheduling procedure. An HARQ response for the downlink data channel may be transmitted through 4 uplink control channels. That is, the HARQ response may be repeatedly transmitted four times.

For example, the terminal may receive a downlink data channel #1 in a slot # n and may repeatedly transmit an HARQ response #1 (e.g., an uplink control channel #1) for the downlink data channel #1 in consecutive slots # (n+4) to # (n+7). Also, the terminal may receive a downlink data channel #2 in a slot # (n+2), and may repeatedly transmit an HARQ response #2 (e.g., an uplink control channel #2) for the downlink data channel #2 in consecutive slots # (n+5) to # (n+8). In this case, HARQ responses for different HARQ processes may be respectively transmitted in the slots # (n+5) to # (n+7). Therefore, the number of HARQ responses transmitted through the slot # (n+4) or # (n+8) may be different from the number of HARQ responses transmitted through each of the slots # (n+5) to # (n+7). When the uplink control channel is repeatedly transmitted, the HARQ response may be encoded based on various schemes in order to properly maintain the number of HARQ responses. For example, the HARQ response may be generated in TB units (or a small number of CBG units).

Meanwhile, a position of frequency resource through which the uplink control channel (e.g., HARQ response) is repeatedly transmitted may be maintained to be the same. Alternatively, the uplink control channel may be repeatedly transmitted through different frequency resources. For example, the base station may estimate a position of the terminal based on signals (e.g., reference signals) received from the terminal or information (e.g., downlink path loss information, power headroom information, etc.), and inform the terminal estimated to be located at the coverage boundary of the base station of information on a frequency resource (e.g., subcarrier index, PRB index, etc.) allocated for the uplink control channel through an upper layer signaling procedure.

In the embodiment where the uplink control channel is transmitted through the same frequency resource, the base station may require a relatively large number of reference signals to estimate the uplink control channel of the terminal located at the coverage boundary of the base station. Therefore, the terminal may transmit a DM-RS using the same frequency resource within coherence time, and the base station may correctly estimate the uplink control channel using the DM-RS received from the terminal. In this case, demodulation and decoding errors of the uplink control channel may be reduced.

When the uplink control channel is transmitted through different frequency resources, a gain due to frequency multiplexing may be obtained. In this case, the base station may obtain the uplink control channel relatively accurately from the terminal located at the coverage boundary of the base station. However, since the amount of UCI transmitted through the uplink control channel is large, an error may occur. In order to solve this problem, the base station may perform a soft combining operation on the UCI repeatedly received through the uplink control channel. The type and size of the UCI included in the uplink control channel may be always the same or different each time. However, since the base station knows RE mapping of the UCI in advance, errors in demodulation and decoding may be reduced by performing the soft combining operation on the received UCI. For example, when the UCI includes an HARQ response, the terminal may map the UCI to REs using the HARQ response codebook defined in the 3GPP TS, and thus the terminal may identify the HARQ response by performing the soft combining operation on the UCI at bit-level.

The terminal may perform an encoding operation according to the size of UCI (e.g., HARQ response) transmitted through the uplink control channel. For example, the terminal may perform the encoding operation using spreading codes when the size of the UCI (e.g., HARQ response) is 1 bit or 2 bits. The terminal may perform the encoding operation using a linear block code (e.g., Reed Muller code, polar code) when the size of the UCI (e.g., HARQ response) is 3 bits or more.

When the uplink control channel is configured to be repeatedly transmitted through the upper layer signaling procedure, the terminal may transmit uplink control channels having different RVs (e.g., UCI having different RVs) for each transmission instance of the uplink control channel. Different types of UCI may have different RVs. Also, different coding rates may be applied to the different types of UCI having different RVs, and the different types of UCIs may be mapped to REs of uplink control channels. The base station may improve reception quality by performing a soft combining operation on the UCI having different RVs. The above-described method may be applied to a scenario in which the coding rate of the uplink control channel remains the same. For example, in frequency division duplex (FDD) and TDD-based communication systems, since the length of the uplink interval occupied by the uplink control channel is the same, the terminal may maintain the same coding rate by using the same time-frequency resource.

Meanwhile, in the TDD-based communication system, since the length of the uplink interval is variable, the length of the uplink control channel transmitted by the terminal may not be constant. In this case, the serving base station may inform the terminal of the length of the uplink interval. For example, the base station may transmit resource allocation information (e.g., the length of uplink control channel, the starting symbol position (e.g., starting symbol index, etc.) of the uplink control channel, etc.) of the uplink control channel through which the HARQ response for the downlink data channel is transmitted. When the terminal repeatedly transmits the uplink control channel n times in n slots, the resource allocation information of the uplink control channel may be different for each slot. In this case, the base station may transmit the resource allocation information of the n uplink control channels through the downlink control channel. Here, n may be an integer of 1 or more.

Meanwhile, due to existence of uplink control channels of other terminals (e.g., uplink control channel of a narrow interval, short PUCCH), existence of a sounding reference signal (SRS), or the like, the number of symbols available for the uplink control channel for each uplink slot may be variable. Since all the symbols belonging to the uplink slot may not be used for the uplink control channel of a single terminal, the base station may inform the terminal of resource allocation information of the uplink control channel through a signaling procedure even in the TDD or FDD-based communication system.

For example, the serving base station may inform the terminal of information on symbols (e.g., symbols per uplink slot) used by the uplink control channel (e.g., the number of symbols used by the uplink control channel, the ending symbol index of the uplink control channel, etc.). The information on the symbols used by the uplink control channel may be transmitted through a downlink control channel (e.g., a downlink control channel through which resource allocation information of a downlink data channel corresponding to the uplink control channel is transmitted) or an upper layer signaling procedure.

In this case, the terminal may identify the information on the symbols used by the uplink control channel. The time resource of the uplink control channel may be specified when the terminal knows the starting symbol index of the uplink control channel. The starting symbol index of the uplink control channel may correspond to a slot format. The serving base station may inform the terminal of the starting symbol index (e.g., slot format) of the uplink control channel through a downlink control channel (e.g., a downlink control channel through which resource allocation information of a downlink data channel corresponding to the uplink control channel is transmitted) or an upper layer signaling. Alternatively, the serving base station may transmit the starting symbol index (e.g., slot format) of the uplink control channel through a separate downlink control channel in a broadcast manner. According to the above-described method, the terminal may identify the number of symbols used by the uplink control channel and the starting symbol index of the uplink control channel in each uplink slot.

However, the uplink control channel may not always be transmitted in consecutive uplink slots. For example, in the TDD-based communication system, an uplink control channel may not be continuously transmitted due to a downlink slot. Alternatively, if the number of symbols included in the uplink slot is small, the uplink control channel may not be transmitted through the corresponding uplink slot. That is, even when the maximum bandwidth (e.g., the maximum number of PRBs) configured by the serving base station is used for transmission of the uplink control channel, if a coding rate higher than the maximum coding rate (e.g., the maximum coding rate allowed in 3GPP TS) is required, the uplink control channel may not be transmitted through the corresponding uplink slot.

Meanwhile, the serving base station may transmit a slot format indicator indicating an unknown resource (e.g., an unknown symbol or a slot including an unknown symbol) in a broadcast manner using a downlink control channel. The terminal may receive downlink data through the unknown resource and may transmit an HARQ response (e.g., UCI) for the downlink data. Also, the terminal may transmit uplink data scheduled by the downlink control channel through the unknown resource. The remaining terminals other than the terminal may not transmit or receive a signal in a case where the unknown resource partially overlaps with their resources for transmission and reception (e.g., a case where an unknown resource exists in one or more symbols constituting the resource configured by an upper layer signaling from the base station). For example, the unknown resource may be used for transmission and reception of downlink and uplink data. Alternatively, the unknown resource may be used for various purposes.

When a resource (hereinafter referred to as 'uplink allocation resource') through which an uplink channel (e.g., uplink data channel or uplink control channel) is to be transmitted does not overlap with the unknown resource, the terminal may transmit the uplink channel through the uplink allocation resource. When the uplink allocation resource partially overlaps with the unknown resource, the terminal may considered the resource overlapped with the unknown resource as the uplink allocation resource, and may transmit the uplink channel through the considered uplink allocation resource. Alternatively, the uplink channel may not be transmitted due to the unknown resource. In this case, the uplink channel that is not transmitted due to the unknown resource may not be counted as the repeated transmission of the uplink channel. Alternatively, the uplink channel that is not transmitted due to the unknown resource may be counted as the repeated transmission of the uplink channel.

Figure 14A:
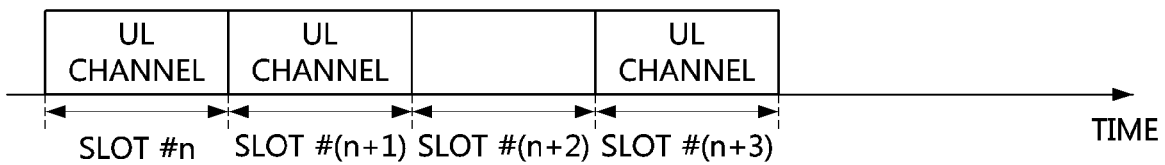
FIG. 14A is a timing chart illustrating a first embodiment of a transmission method of an uplink channel in a communication system.
Figure 14B:
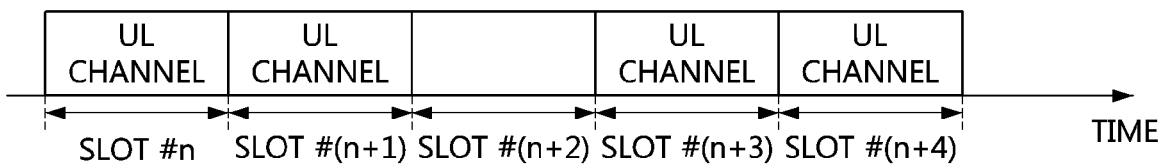
FIG. 14B is a timing chart illustrating a second embodiment of a transmission method of an uplink channel in a communication system.

FIG. 14A is a timing chart illustrating a first embodiment of a transmission method of an uplink channel in a communication system, and FIG. 14B is a timing chart illustrating a second embodiment of a transmission method of an uplink channel in a communication system.

Referring to FIGS. 14A and 14B, a slot # (n+2) may be a slot including an unknown symbol, and an uplink channel (e.g., uplink data channel or uplink control channel) may not be transmitted through the slot # (n+2). For example, when the unknown symbol overlaps with the uplink channel, the uplink channel may not be transmitted through the slot # (n+2). The uplink channel may be repeatedly transmitted four times in the time domain, and may be transmitted in a frequency hopping manner. In FIG. 14A, the uplink channel not transmitted through the slot including the unknown symbol may be counted as the repeated transmission of the uplink channel. In this case, the number of times the uplink channel is actually repeatedly transmitted (i.e., three times) may be smaller than the predetermined number of repeated transmission times (i.e., four times). In FIG. 14B, the uplink channel not transmitted by the slot including the unknown symbol may not be counted as the repeated transmission of the uplink channel. In this case, the number of times the uplink channel is actually repeatedly transmitted (i.e., four times) may be the same as the predetermined number of repeated transmission times (i.e., four times). The reception error rate of the uplink channel in the embodiment shown in FIG. 14A may be greater than the reception error rate of the uplink channel in the embodiment shown in FIG. 14B.

Meanwhile, at least one of time resource, frequency resource, and sequence resource used by the uplink control channel may be different for each slot. In this case, resource information of the uplink control channel of each slot may be transmitted through the downlink control channel used for transmission of the resource allocation information of the downlink data channel. Therefore, time-frequency resources for the uplink control channel may be configured differently for each slot, and uplink control channels of a plurality of terminals may be transmitted in a time division multiplexing (TDM) scheme in one slot. In the TDD or FDD-based communication system, when the length of uplink slot is variable, the terminal may transmit the UCI by using different time-frequency resources in a plurality of uplink slots in order to maintain the same coding rate of UCI in the plurality of uplink slots. For example, when the UCI is repeatedly transmitted twice, the terminal may transmit UCI through a resource composed of 2 symbols and 12 subcarriers in the first uplink slot, and may transmit UCI through a resource composed of 1 symbol and 24 subcarriers in the second uplink slot. Therefore, the coding rate of the UCI in the first uplink slot may be the same as the coding rate of the UCI in the second uplink slot.

In this case, the resource information (e.g., resource index) of the uplink control channel signaled from the serving base station to the terminal may indicate both of the time resource (e.g., the number of symbols used for the uplink control channel) occupied by the uplink control channel in each uplink slot and the frequency resource (e.g., the number of PRBs used for the uplink control channel). In this case, the base station may transmit a slot type using the downlink control channel used for transmission of resource allocation information of the downlink data channel or a separate downlink control channel, so as to inform the terminal of the first symbol used for transmission of the uplink control channel in the uplink slot.

According to the above-described methods, the time resource for the uplink control channel may be allocated differently in each of the slots, and the terminal may repeatedly transmit the uplink control channel in the consecutive slots based on the resource allocation information. In this case, the delay time due to repeated transmission of the uplink control channel may be reduced. As another method for indicating the length of the uplink control channel, the base station may transmit information on the length of the uplink control channel through a separate downlink control channel instead of the downlink control channel used for transmission of the resource allocation information of the downlink data channel in a broadcast manner.

In this case, the terminal may identify the length of the uplink control channel in the uplink slot (e.g., uplink-centric slot). Also, the terminal may identify the last symbol index of the uplink control channel through a separate signaling procedure, and derive the number of symbols used for the uplink control channel based on the last symbol index of the uplink control channel. However, when the uplink control channel is repeatedly transmitted and the length of the uplink control channel is different in the respective slots in which the uplink control channel is repeatedly transmitted, coding rates of the uplink control channels (e.g., UCI) in the respective slots may vary. In this case, the base station may not perform a soft combining operation on the uplink control channel (e.g., UCI).

The terminal may perform an encoding operation on the UCI based on the minimum coding rate configured by an upper layer signaling procedure of the serving base station or the minimum coding rate defined in the 3GPP TS. The ratio of the number (n) of modulated symbols to the maximum number of bits (k) of the UCI transmitted through the uplink control channel may indicate a coding rate. The terminal may generate a modulated symbol by performing a modulation operation on the encoded bits, and may map the modulated symbol to m REs constituting the uplink control channel. The effective coding rate of the UCI may be a function of k, n and m, and the coding rate that remains constant for the soft combining operation in the decoding procedure may be a function of k and n. For example, for soft combining on polar code, k and n may be set at a fixed ratio. Here, each of k, n and m may be an integer of 1 or more.

The size (m) of the uplink control channel may be calculated to obtain the coding rate (k, n). In a dynamic TDD-based communication system, since the uplink control channel occupies more than 4 symbols of time resource, the serving base station may inform the terminal of frequency resource information (i.e., bandwidth occupied by the uplink control channel) of the uplink control channel through an upper layer signaling procedure so as to obtain a desired coding rate (k, n, m).

That is, the serving base station may allocate the minimum resource of the uplink control channel to the terminal. When the terminal repeatedly transmits the uplink control channel more than k times, the resource size (m) used for the uplink control channel may be different in each transmission. Here, k may be an integer of 2 or more, and n may be equal to or less than m. The terminal may repeatedly map the modulated symbols to REs to maintain the coding rate (k, n). For example, the terminal may map n modulated symbols (e.g., modulated symbols #1, #2, #3, . . . , # n) to m REs (e.g., REs #1, #2, #3, . . . , # m), and may repeatedly map (m−n)

modulated symbols (e.g., modulated symbols #1, #2, #3, ..., # (m−n)) to (m−n) REs (e.g., REs # (n+1), # (n+2), # (n+3), ..., # m). Also, when UCI having different RVs are repeatedly transmitted, the terminal may repeatedly map modulated symbols of the UCI having different RVs to different numbers of REs based on the above-described scheme to maintain the coding rate (k, n).

Meanwhile, the location of the frequency resource used for transmission of the uplink control channel may be determined based on the following embodiments.

Figure 15A:
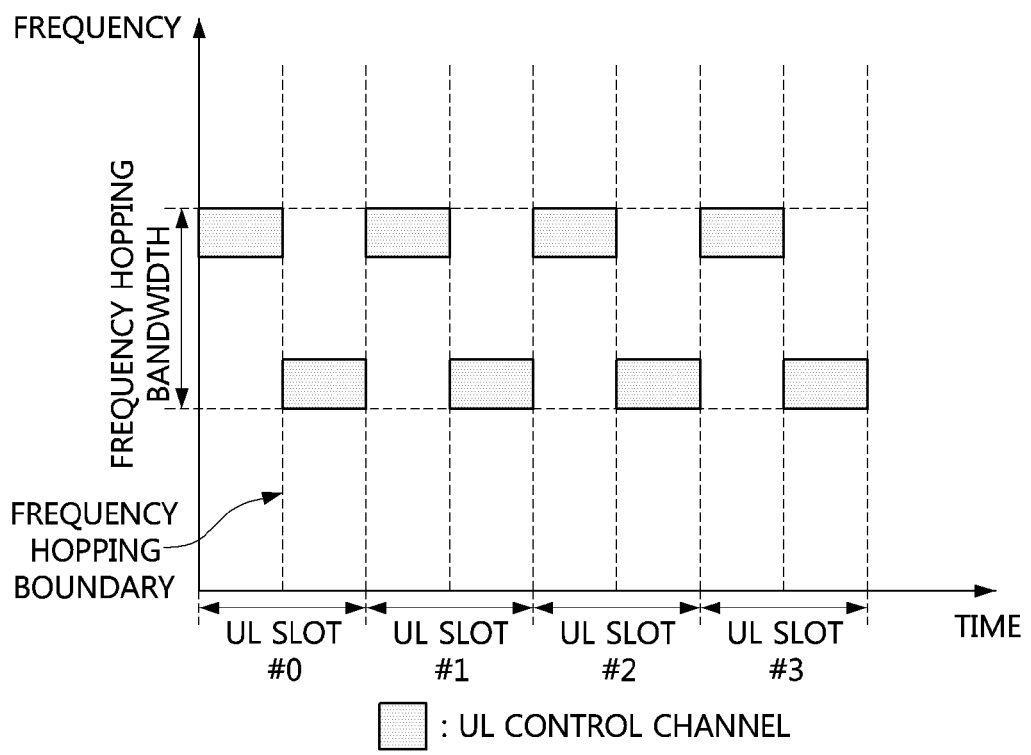
FIG. 15A is a timing chart illustrating a third embodiment of a transmission method of an uplink channel in a communication system.

FIG. 15A is a timing chart illustrating a third embodiment of a transmission method of an uplink channel in a communication system.

Referring to FIG. 15A, when the terminal repeatedly transmits the uplink control channel more than k times, the number of frequency bands used for transmission of the uplink control channel may be two or more. Here, k may be an integer of 2 or more. The uplink control channel may be transmitted in a frequency hopping manner within the same uplink slot, and the same frequency hopping pattern may be used in the uplink slots in which the uplink control channel is repeatedly transmitted. In a dynamic or static TDD-based communication system, an uplink control channel may be transmitted using some symbols in a slot.

Figure 15B:
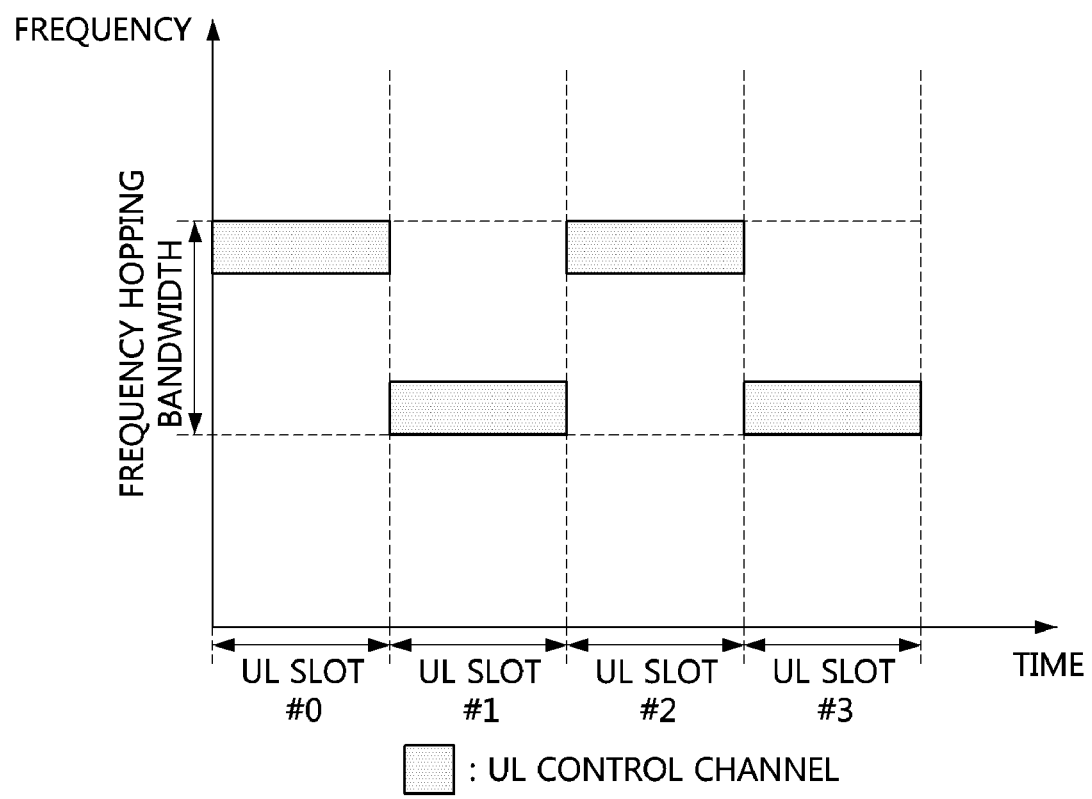
FIG. 15B is a timing chart illustrating a fourth embodiment of a transmission method of an uplink channel in a communication system.

FIG. 15B is a timing chart illustrating a fourth embodiment of a transmission method of an uplink channel in a communication system.

Referring to FIG. 15B, the terminal may repeatedly transmit the uplink control channel two or more times. The uplink control channel may be transmitted in a frequency hopping scheme in uplink slot units. In this case, the base station may configure the terminal through an upper layer signaling procedure so that the terminal performs frequency hopping for the uplink control channel in the same uplink slot. The uplink control channel may be transmitted through two frequency bands, so that a frequency multiplexing gain can be obtained. In a dynamic or static TDD-based communication system, an uplink control channel may be transmitted using some symbols in a slot.

Figure 15C:
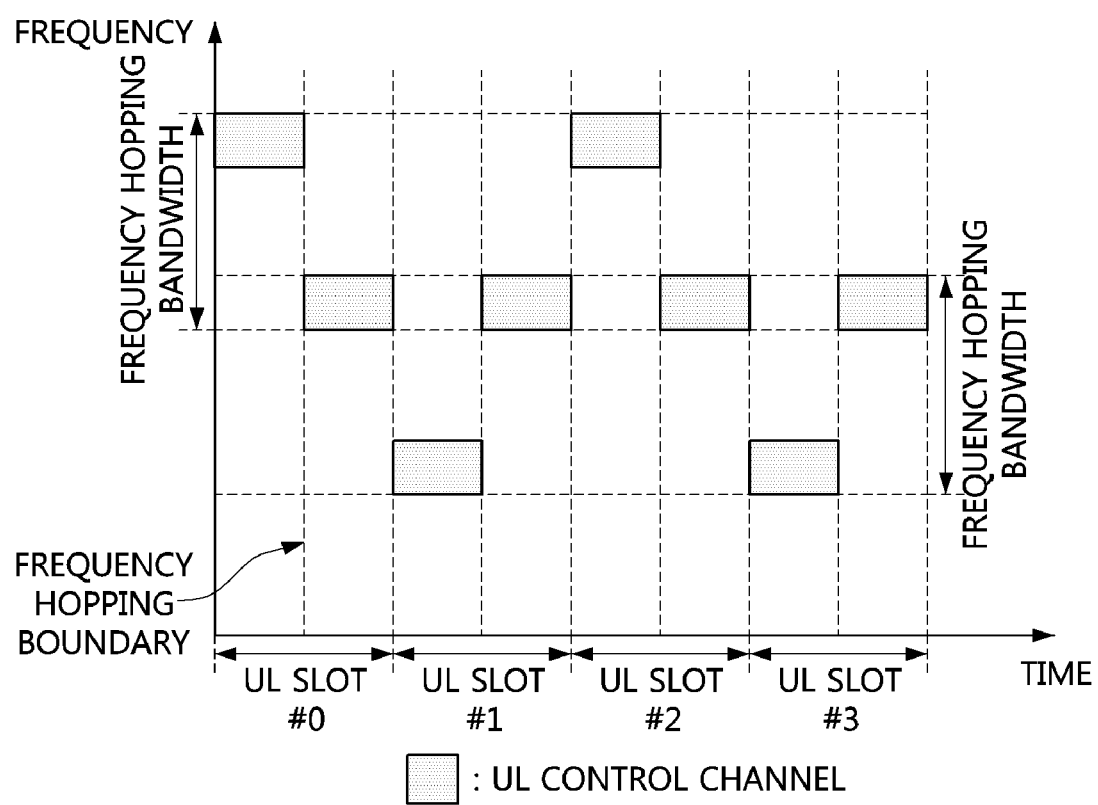
FIG. 15C is a timing chart illustrating a fifth embodiment of a transmission method of an uplink channel in a communication system.

FIG. 15C is a timing chart illustrating a fifth embodiment of a transmission method of an uplink channel in a communication system.

Referring to FIG. 15C, the terminal may repeatedly transmit the uplink control channel at least two times, and the uplink control channel may be transmitted through at least three frequency bands. That is, the base station may configure the terminal through an upper layer signaling procedure so that the terminal transmits the uplink control channel using at least three frequency bands. The uplink control channel may be transmitted in a frequency hopping manner within the same uplink slot, and the frequency hopping pattern of the uplink control channel may be different in each of the uplink slots. The uplink control channel may be transmitted through two frequency bands in each of the uplink slots, and the center frequencies applied to the hopping of the uplink control channel in adjacent uplink slots may be different from each other.

The base station may inform the terminal of the frequency hopping pattern of each uplink slot through an upper layer signaling procedure. For example, the frequency hopping pattern may be indicated by a function of an index of an uplink slot through which the uplink control channel is transmitted. In order to maximize the frequency multiplexing gain, the uplink control channel may be transmitted through the center band as well as the edge band in the frequency domain.

In a first embodiment of a method of notifying the terminal of three frequency bands in which the uplink control channel is transmitted, the base station may inform the terminal of the number (k) of repeated transmissions of the uplink control channel, the frequency hopping bandwidth ($\Delta F$) of the uplink control channel, and the center frequencies (f1, f2, ..., fk) of the uplink control channel in the uplink slots through an upper layer signaling procedure. When the uplink bandwidth preset by the base station is used as the frequency hopping bandwidth of the uplink control channel, the base station may not inform the terminal of the center frequencies of the uplink control channel through the upper layer signaling procedure. The terminal may transmit the uplink control channel using frequency resources (fk−$\Delta F/2$) and (fk+$\Delta F/2$) in the k-th uplink slot. Alternatively, the terminal may identify the positions of the frequency bands through which the uplink control channel is transmitted based on the center frequencies of the uplink control channel and the uplink slot index in the uplink slots.

In a second embodiment of a method for informing the terminal of three frequency bands in which the uplink control channel is transmitted, the base station may inform the terminal of the positions of resources (e.g., positions of frequency resources) used for transmission of the uplink control channel in uplink slots through an upper layer signaling procedure. The terminal may calculate the positions of the frequency resources actually used for transmission of the uplink control channel based on the information obtained through the upper layer signaling procedure. For example, the base station may inform the terminal of the frequency resources used for transmission of the uplink control channel through a combination of an upper layer signaling procedure and a DCI transmission procedure. In this case, the terminal may calculate the positions of frequency resources used for transmission of the uplink control channel using a value configured by the upper layer signaling procedure and a value indicated by the DCI. If the value configured by the upper layer signaling procedure differs for each uplink slot and the value indicated by the DCI is the same in uplink slots, the terminal may calculate positions of different frequency resources in uplink slots.

When the uplink control channel is transmitted through three or more frequency bands, the base station may receive the uplink control channel in the middle band as well as the edge band in the frequency domain. In this case, the uplink control channel of the first terminal may coexist with the uplink data channel of the second terminal. The base station may adjust the frequency hopping boundary and DM-RS positions of the uplink control channel and uplink data channel so as to facilitate coexistence in scheduling the terminals. The terminals may multiplex the DM-RSs of the uplink channels according to a CDMA scheme, and the base station may distinguish the DM-RSs of the terminals based on the CDMA scheme. Here, the DM-RS may be generated based on the same sequence (e.g., a Zadoff-Chu sequence, a constant amplitude zero auto correlation (CAZAC) sequence, etc.).

Simultaneous Support of PUSCH Bundling Transmission and PUCCH Repeated Transmission In order to improve a transmission range of the uplink data channel, the serving base station may inform the terminal of the number of repeated transmissions of the uplink data channel through an uplink signaling procedure. Also, in order to improve the transmission range of the uplink control channel, the serving base station may inform the terminal of the number of repeated transmissions of the uplink control channel through an uplink signaling procedure.

When uplink data is generated, the terminal may transmit a scheduling request for transmission of the uplink data to the serving base station. In response to the scheduling request, the terminal may receive DCI including resource allocation information (e.g., downlink control channel) of the uplink data channel from the serving base station. Also, when downlink data is generated, the serving base station may transmit DCI (e.g., downlink control channel) including resource allocation information of a downlink data channel to the terminal, and transmit the downlink data to the terminal through the downlink data channel. The terminal may receive the downlink data and generate an HARQ response for the downlink data.

In this case, if an uplink slot in which the HARQ response for the downlink data is to be transmitted is the same as an uplink slot in which the uplink data is to be transmitted, the terminal may transmit the HARQ response and the uplink data to the serving base station through the uplink data channel in the corresponding slot. Here, the terminal may map the HARQ response to a region of the uplink data channel. Also, when the uplink control channel and the uplink data channel are repeatedly transmitted, the uplink slots through which the uplink control channel is transmitted may be overlapped with the uplink slots through which the uplink data channel is transmitted.

Figure 16D:
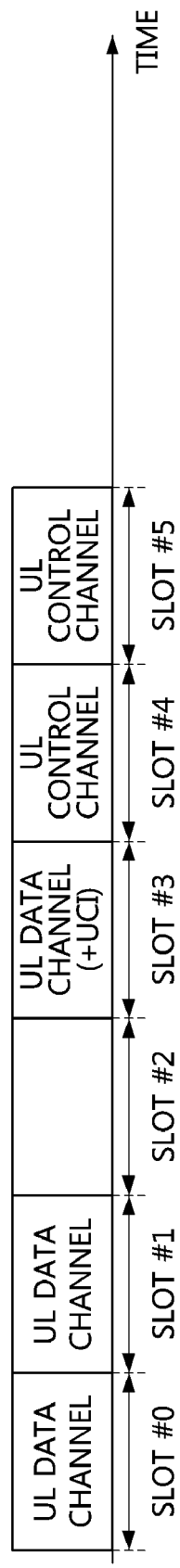
FIG. 16D is a timing chart illustrating a fourth embodiment of a transmission scheme of uplink control/data channel in a communication system.

FIG. 16A is a timing chart illustrating a first embodiment of a transmission scheme of uplink control/data channel in a communication system, FIG. 16B is a timing chart illustrating a second embodiment of a transmission scheme of uplink control/data channel in a communication system, FIG. 16C is a timing chart illustrating a third embodiment of a transmission scheme of uplink control/data channel in a communication system, and FIG. 16D is a timing chart illustrating a fourth embodiment of a transmission scheme of uplink control/data channel in a communication system.

Referring to FIGS. 16A to 16D, the serving base station may allocate the uplink data channel first, and then allocate the uplink control channel. The uplink data channel may be repeatedly transmitted four times, and the uplink control channel (e.g., UCI) may also be repeatedly transmitted four times. In this case, one or more slots among the slots through which the uplink data channel is to be transmitted may be overlapped with the slots through which the uplink control channel is to be transmitted. Each of the uplink data channel and the uplink control channel may be transmitted based on a frequency hopping scheme.

In FIG. 16A, the terminal may transmit the uplink data channel through the slots #0 to #1 (e.g., uplink slot or uplink-centric slot), the uplink data channel and the uplink control channel through the slots #2 to #3 (e.g., uplink slot or uplink-centric slot), and the uplink control channel through the slots #4 to #5 (e.g., uplink slot or uplink-centric slot). That is, in the slots #2 to #3, the uplink data channel and the uplink control channel may be simultaneously transmitted.

In FIG. 16B, the terminal may transmit the uplink data channel through the slots #0 to #1 (e.g., uplink slot or uplink-centric slot), the uplink data channel including the uplink data and the UCI through the slots #2 to #3 (e.g., uplink slot or uplink-centric slot), and the uplink control channel through the slots #4 to #5 (e.g., uplink slot or uplink-centric slot). That is, in the slots #2 to #3, the uplink data channel and the uplink control channel may not be simultaneously transmitted, and the uplink data channel including the uplink data and the UCI may be transmitted.

In FIG. 16C, the terminal may transmit the uplink data channel through the slots #0 to #1 (e.g., uplink slot or uplink-centric slot), and if the slot #2 includes an unknown symbol, the terminal may transmit no signal through the slot #2. For example, if a resource used for transmission of the uplink data channel or the UCI overlaps with the unknown symbol, no signal may be transmitted through the slot #2. The uplink channel not transmitted through the slot including the unknown symbol may not be counted as the repeated transmission of the uplink channel. The terminal may transmit the uplink data channel including the uplink data and UCI through the slots #3 to #4 (e.g., uplink slot or uplink-centric slot), and the uplink control channel through the slots #5 to #6 (e.g., uplink slot or uplink-centric slot). That is, in the slots #3 to #4, the uplink data channel and the uplink control channel may not be simultaneously transmitted, and the uplink data channel including the uplink data and the UCI may be transmitted.

In FIG. 16D, the terminal may transmit the uplink data channel through the slots #0 to #1 (e.g., uplink slot or uplink-centric slot), and if the slot #2 includes an unknown symbol the terminal may transmit no signal through the slot #2. For example, if a resource used for transmission of the uplink data channel or the UCI overlaps with the unknown symbol, no signal may be transmitted through the slot #2. The uplink channel not transmitted through the slot including the unknown symbol may be counted as the repeated transmission of the uplink channel. The terminal may transmit the uplink data channel including the uplink data and UCI through the slots #3 to #4 (e.g., uplink slot or uplink-centric slot). In this case, the uplink data channel may be transmitted in the first slot (i.e., slot #3) determined to be able to transmit the uplink data channel after the slot including the unknown symbol. Also, the terminal may transmit the uplink control channel through the slots #4 to #5 (e.g., uplink slot or uplink-centric slot). That is, in the slot #3, the uplink data channel and the uplink control channel may not be simultaneously transmitted, and the uplink data channel including the uplink data and the UCI may be transmitted.

In the embodiments of FIGS. 16A to 16D, when the number of PRBs for the uplink data channel is calculated, the serving base station may not expect that the uplink data is punctured by the UCI bits or the rate matching for the uplink data is performed. Therefore, it may be preferable that the serving base station allocates a slot for the uplink control channel to the terminal after the repeated transmission of the uplink data channel is completed. Alternatively, the size of the UCI transmitted together with the uplink data may be adjusted through the uplink data channel, so that the above-mentioned problems can be solved.

Unlike the embodiments shown in FIGS. 16A to 16D, in the embodiments shown in FIGS. 17A to 17D below, the serving base station may allocate the uplink control channel first, and then allocate the uplink data channel.

Figure 17A:
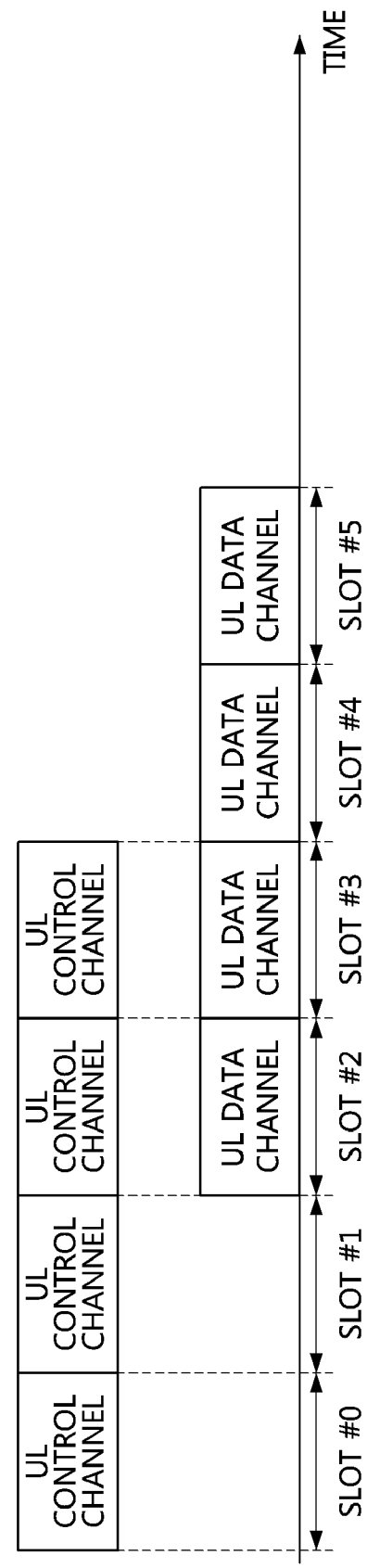
FIG. 17A is a timing chart illustrating a fifth embodiment of a transmission scheme of uplink control/data channel in a communication system.
Figure 17B:
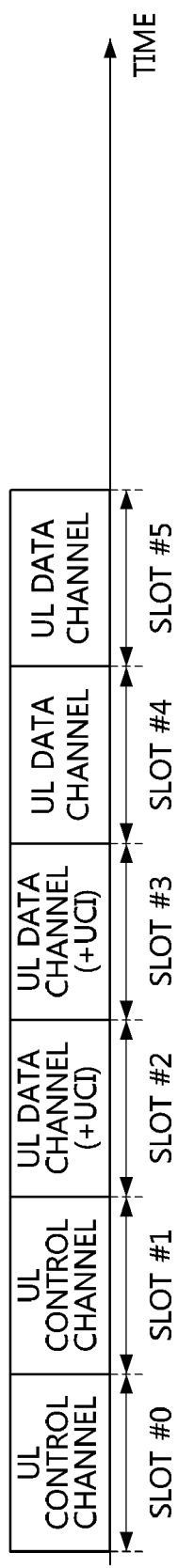
FIG. 17B is a timing chart illustrating a sixth embodiment of a transmission scheme of uplink control/data channel in a communication system.
Figure 17C:
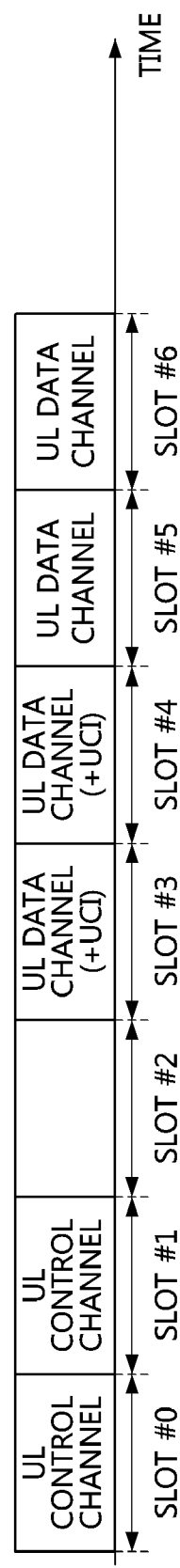
FIG. 17C is a timing chart illustrating a seventh embodiment of a transmission scheme of uplink control/data channel in a communication system.
Figure 17D:
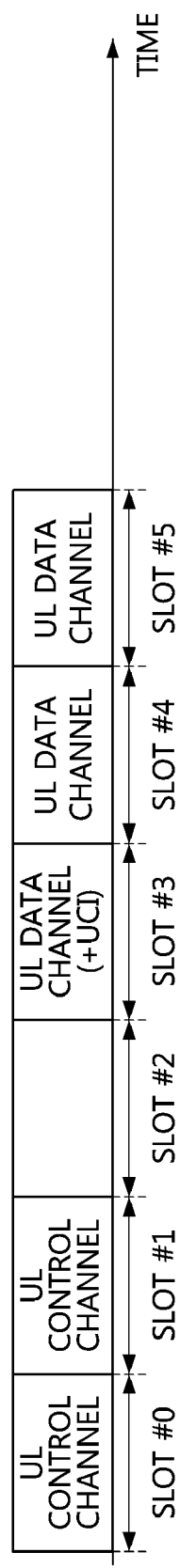
FIG. 17D is a timing chart illustrating an eighth embodiment of a transmission scheme of uplink control/data channel in a communication system.

FIG. 17A is a timing chart illustrating a fifth embodiment of a transmission scheme of uplink control/data channel in a communication system, FIG. 17B is a timing chart illustrating a sixth embodiment of a transmission scheme of uplink control/data channel in a communication system, FIG. 17C is a timing chart illustrating a seventh embodiment of a transmission scheme of uplink control/data channel in a communication system, and FIG. 17D is a timing chart illustrating an eighth embodiment of a transmission scheme of uplink control/data channel in a communication system.

Referring to FIGS. 17A to 17D, the serving base station may allocate the uplink data channel first, and then allocate the uplink control channel. The uplink data channel may be repeatedly transmitted four times, and the uplink control channel (e.g., UCI) may also be repeatedly transmitted four times. In this case, one or more slots among the slots through which the uplink control channel is to be transmitted may be overlapped with the slots through which the uplink data channel is to be transmitted. Each of the uplink data channel and the uplink control channel may be transmitted based on a frequency hopping scheme.

In FIG. 17A, the terminal may transmit the uplink control channel through the slots #0 to #1 (e.g., uplink slot or uplink-centric slot), the uplink control channel and the uplink data channel through the slots #2 to #3 (e.g., uplink slot or uplink-centric slot), and the uplink data channel through the slots #4 to #5 (e.g., uplink slot or uplink-centric slot). That is, in the slots #2 to #3, the uplink data channel and the uplink control channel may be simultaneously transmitted.

In FIG. 17B, the terminal may transmit the uplink control channel through the slots #0 to #1 (e.g., uplink slot or uplink-centric slot), the uplink data channel including the uplink data and the UCI through the slots #2 to #3 (e.g., uplink slot or uplink-centric slot), and the uplink data channel through the slots #4 to #5 (e.g., uplink slot or uplink-centric slot). That is, in the slots #2 to #3, the uplink data channel and the uplink control channel may not be simultaneously transmitted, and the uplink data channel including the uplink data and the UCI may be transmitted.

In FIG. 17C, the terminal may transmit the uplink control channel through the slots #0 to #1 (e.g., uplink slot or uplink-centric slot), and if the slot #2 includes an unknown symbol, the terminal may transmit no signal through the slot #2. For example, if a resource used for transmission of the uplink data channel or the UCI overlaps with the unknown symbol, no signal may be transmitted through the slot #2. The uplink channel not transmitted through the slot including the unknown symbol may not be counted as the repeated transmission of the uplink channel. The terminal may transmit the uplink data channel including the uplink data and UCI through the slots #3 to #4 (e.g., uplink slot or uplink-centric slot), and the uplink data channel through the slots #5 to #6 (e.g., uplink slot or uplink-centric slot). That is, in the slots #3 to #4, the uplink control channel and the uplink data channel may not be simultaneously transmitted, and the uplink data channel including the uplink data and the UCI may be transmitted.

In FIG. 17D, the terminal may transmit the uplink control channel through the slots #0 to #1 (e.g., uplink slot or uplink-centric slot), and if the slot #2 includes an unknown symbol the terminal may transmit no signal through the slot #2. For example, if a resource used for transmission of the uplink data channel or the UCI overlaps with the unknown symbol, no signal may be transmitted through the slot #2. The uplink channel not transmitted through the slot including the unknown symbol may be counted as the repeated transmission of the uplink channel. The terminal may transmit the uplink data channel including the uplink data and UCI through the slots #3 to #4 (e.g., uplink slot or uplink-centric slot). In this case, the uplink data channel may be transmitted in the first slot (i.e., slot #3) determined to be able to transmit the uplink data channel after the slot including the unknown symbol. Also, the terminal may transmit the uplink data channel through the slots #4 to #5 (e.g., uplink slot or uplink-centric slot). That is, in the slot #3, the uplink control channel and the uplink data channel may not be simultaneously transmitted, and the uplink data channel including the uplink data and the UCI may be transmitted.

In the embodiments of FIGS. 17A to 17D, when the number of PRBs for the uplink data channel is calculated, the serving base station may expect that the uplink data is punctured by the UCI bits or the rate matching for the uplink data is performed. In this case, the serving base station may transmit the resource allocation information of the uplink data channel considering the puncturing or rate matching of the uplink data to the terminal. Therefore, the base station may minimize influence of the UCI bits when decoding the uplink data channel.

Meanwhile, when the UCI includes an HARQ response and the CSI (e.g., periodic CSI or semi-persistent CSI), the serving base station may allocate a resource for the uplink data channel considering the corresponding UCI. When the UCI includes an HARQ response and aperiodic CSI, the serving base station may request the terminal to transmit aperiodic CSI through the downlink control channel. Therefore, the serving base station may allocate a resource for the uplink data channel considering the corresponding UCI. When the UCI includes an HARQ response of 3 bits or more and the corresponding UCI is transmitted through the uplink data channel together with the uplink data, the terminal may perform a rate matching on the uplink data channel. When the UCI includes a 1-bit or 2-bit HARQ response and the corresponding UCI is transmitted through the uplink data channel together with the uplink data, the terminal may perform puncturing on the uplink data channel. Also, when the UCI is transmitted through the uplink data channel, the terminal may compress the HARQ response bits included in the UCI.

For example, if a plurality of downlink data channels are received, the terminal may perform a logical AND operation on the HARQ responses for the received plurality of downlink data channels to generate a 1-bit or 2-bit HARQ response (e.g., 1-bit or 2 bits of HARQ response for each space). In this case, puncturing on the uplink data channel may be performed to transmit the 1-bit or 2-bit HARQ response through the uplink data channel.

Alternatively, when a downlink data channel composed of a plurality of CBGs is received, the terminal may perform a logical AND operation on HARQ responses for the received plurality of CBGs (e.g., a plurality of CBGs belonging to the same TB) to generate a 1-bit or 2-bit HARQ response. When a 2-bit HARQ response is generated, the terminal may generate a 1-bit HARQ response by performing a logical AND operation on the 2-bit HARQ response. In this case, puncturing on the uplink data channel may be performed to transmit the 1-bit or 2-bit HARQ response through the uplink data channel.

Therefore, when the puncturing on the uplink data channel is performed to transmit the HARQ response through the uplink data channel, since the amount of HARQ response is limited to 1 bit or 2 bits, the reception error may be minimized in the decoding process of the uplink data.

Figure 18:
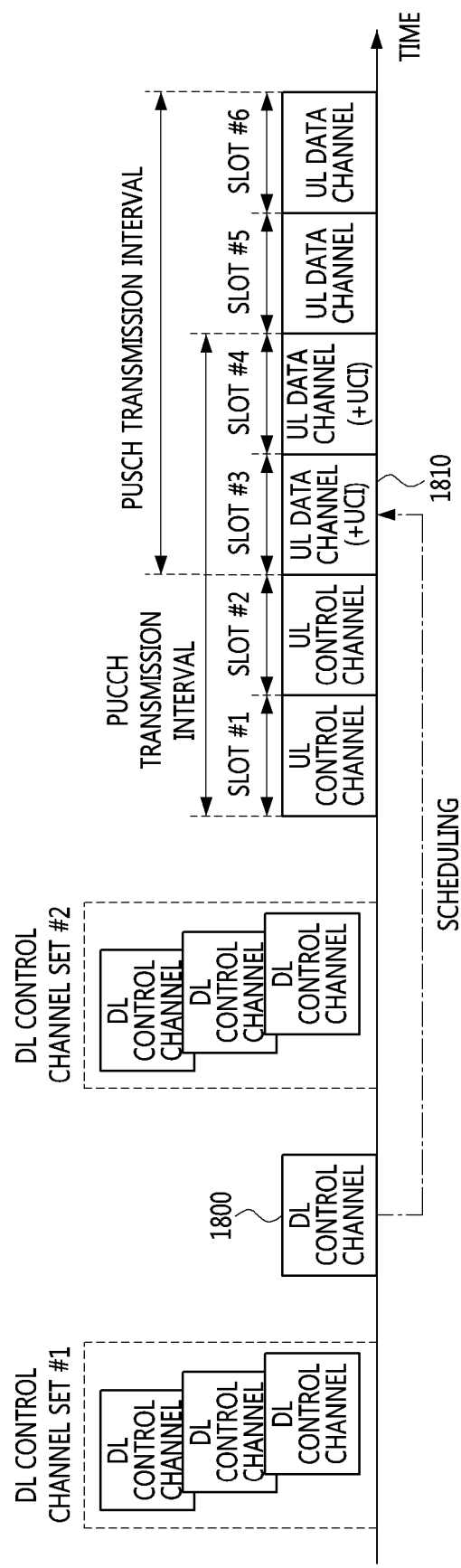
FIG. 18 is a timing chart illustrating a ninth embodiment of a transmission scheme of uplink control/data channel in a communication system.

The embodiment described above may be the same as the embodiment shown in FIG. 18.

FIG. 18 is a timing chart illustrating a ninth embodiment of a transmission scheme of uplink control/data channel in a communication system.

Referring to FIG. 18, the serving base station may transmit a downlink control channel set #1 composed of a plurality of downlink control channels including resource allocation information of downlink data channel, transmit a downlink control channel 1800 including resource allocation information of an uplink data channel 1810, and transmit a downlink control channel set #2 composed of a plurality of downlink control channels including resource allocation information of downlink data channel. The downlink control channel set #1 may be transmitted before the downlink control channel 1800, and the downlink control channel set #2 may be transmitted after the downlink control channel 1800. It is considered that the uplink control channel is repeatedly transmitted four times and the uplink data channel is also repeatedly transmitted four times. In FIG. 18, it may be assumed that the downlink control channel belonging to each of the downlink control channel set #1 and the downlink control channel set #2 instructs the terminal to transmit the uplink control channel in the slot #1. In this case, in the slots #1 to #4, the uplink control channel may be repeatedly transmitted four times. On the other hand, the downlink control channel 1800 may instruct the terminal to transmit the uplink data channel in the slot #3. In this case, if the transmission is repeated four times, the uplink data channel may be repeatedly transmitted four times in the slots #3 to #6.

The serving base station may know the size of the HARQ response (hereinafter referred to as 'HARQ response #1') for the downlink data channels scheduled by the downlink control channel set #1.

In the case that the HARQ response #1 is transmitted through the uplink data channel 1810 scheduled by the downlink control channel 1800, since the serving base station already knows the amount of the HARQ response #1, the serving base station may allocate the resource of the uplink data channel 1810 considering the puncturing or rate matching on the uplink data channel 1810 by the HARQ response #1.

The terminal may receive downlink data channels through the resources indicated by the downlink control channel set #2, generate HARQ responses (hereinafter referred to as 'HARQ response #2') for the received downlink data channels, and perform an encoding operation on the generated HARQ responses #2. In this case, when the HARQ response #1 exists, since the slots for transmitting the uplink control channel overlap, the encoding operation may be performed including both the HARQ response #1 and the HARQ response #2. Since the downlink control channel set #2 is transmitted after the downlink control channel 1800, the base station does not know the amount of the HARQ response #2 at the transmission time point of the downlink control channel 1800 allocating the resources of the uplink data channel 1810. On the other hand, as described above, wen the HARQ response #1 exists, the base station may allocate the resources of the uplink data channel to the terminal considering the amount of the HARQ response #1.

A method is proposed in which the terminal transmits the HARQ response #1 and the HARQ response #2 through the uplink control channel in the same slot #1 according to instruction of the base station. The serving base station may perform resource allocation in which the uplink data channel 1810 considers the HARQ response #1 in the slot #3 and the slot #4 but cannot consider the HARQ response #2. In this case, an operation to reduce the amount of HARQ response #2 may be defined to minimize performance degradation of the uplink data channel 1810 due to the HARQ response #2. The terminal may perform compression for the HARQ response #2. For example, the terminal may generate a 1-bit or 2-bit HARQ response by performing a logical AND operation on the HARQ response #2. This may be applied to both the case of generating a HARQ response for each TB and the case of generating a HARQ response for each CBG in the downlink control channel set #2.

When the HARQ response #1 is transmitted through the uplink data channel 1810 indicated by the downlink control channel 1800 (i.e., when the HARQ response #2 is not transmitted), the terminal may perform a rate matching operation on the uplink data channel 1810 in consideration of the HARQ response #1. Alternatively, when the HARQ response #1 and the HARQ response #2 are transmitted through the uplink data channel 1810 indicated by the downlink control channel 1800, the terminal may perform the rate matching operation on the uplink data channel 1810 in consideration of the HARQ response #1, and perform puncturing on the uplink data channel 1810 for transmission of the HARQ response #2.

Configuration of Variable Payload

In the following embodiment, for the case that repeated transmission of the HARQ response #2 for the downlink data channel #2 is performed before the repetitive transmission of the HARQ response #1 for the downlink data channel #1 is completed, and the slots at which the repeated transmissions of the HARQ response #1 and the HARQ response #2 are started are different from each other, a method of configuring the uplink channel (e.g., uplink payload) will be described. Here, the amount of resources of the uplink channel may be variably configured for each slot.

Referring back to FIG. 13, the base station may transmit the downlink data channel #1 in the slot # n and the downlink data channel #2 in the slot # (n+2). The terminal may receive the downlink data channel #1 in the slot # n, and transmit the HARQ response #1 (i.e., the uplink control channel #1) for the downlink data channel #1 four times in the slots # (n+4) to # (n+7). The terminal may receive the downlink data channel #2 in the slot # (n+2), and transmit the HARQ response #2 (i.e., the uplink control channel #2) for the downlink data channel #2 four times in the slots # (n+5) to # (n+8).

Here, the terminal may generate the HARQ response #1 of m bits and the HARQ response #2 of m' bits. The terminal may determine m and m' based on a function of the number of CBGs and the number of activated downlink CCs obtained through an uplink signaling procedure or a combination of an uplink signaling procedure and downlink control channel transmission procedure. The terminal may determine the size of the HARQ response codebook for the slot # (n+4) to be m bits and determine the size of the HARQ response codebook for the slots # (n+5) to # (n+7) to be (m+m') bits. Also, the terminal may determine the size of the HARQ response codebook for the slot # (n+8) to be m' bits.

The terminal may perform encoding for the HARQ response codebook using a single uplink control channel format (e.g., NR PUCCH format 3) or a plurality of uplink control channel formats according to configuration of the base station. When the single format is used, each of the m bits, (m+m') bits, and m' bits may have the size (e.g., the sufficient number of symbols or the sufficient amount of resource blocks) supported by the single format. When a plurality of formats are used, the terminal may select an appropriate format according to the size of the HARQ response codebook. For example, the terminal may use a format A (e.g., NR PUCCH format 0) when the size of the HARQ response codebook is 1 bit, a format B (e.g., NR PUCCH format 1) when the size of the HARQ response codebook is 2 bits, and a format C (e.g., NR PUCCH format 2, 3, or 4) when the size of the HARQ response codebook is 3 bits or more. As another example, a format D (e.g., LTE PUCCH format 1, 1a, or 1b) may be used when the size of the HARQ response codebook is 1 to 2 bits, a format E (e.g., LTE PUCCH format 1b with channel selection) may be used when the size of the HARQ response codebook is 3 to 4 bits, a format F (e.g., LTE PUCCH format 3) may be used when the size of the HARQ response codebook is 3 to 21 bits, and a format G (e.g., LTE PUCCH format 4 or 5) may be used when the size of the HARQ response codebook is 22 bits or more.

Configuration of Fixed Payload

In the following embodiment, for the case that repeated transmission of the HARQ response #2 for the downlink data channel #2 is performed before repetitive transmission of the HARQ response #1 for the downlink data channel #1 is completed, a method of configuring the uplink channel (e.g., uplink payload) will be described. Here, the size of the HARQ response codebook transmitted through the uplink channel may not be changed.

The base station may inform the terminal of the transmission timing of the HARQ response for the downlink data channel together with the resource allocation information of the corresponding downlink data channel. For example, the base station may inform the terminal of a set of transmission timings of the HARQ response through an upper layer signaling procedure, and may inform the terminal of a transmission timing selected from the set of transmission timings through the downlink control channel used for scheduling for the downlink data channel. The above-described signaling method of the transmission timing of the HARQ response may be applied to both of the slot-based scheduling and the sub-slot based scheduling whose downlink data channel intervals are different.

Therefore, the base station may adjust the transmission timing of the HARQ response for the downlink data channel in order to maintain the size of the HARQ response codebook the same as in the embodiment shown in FIG. 19 below.

Figure 19:
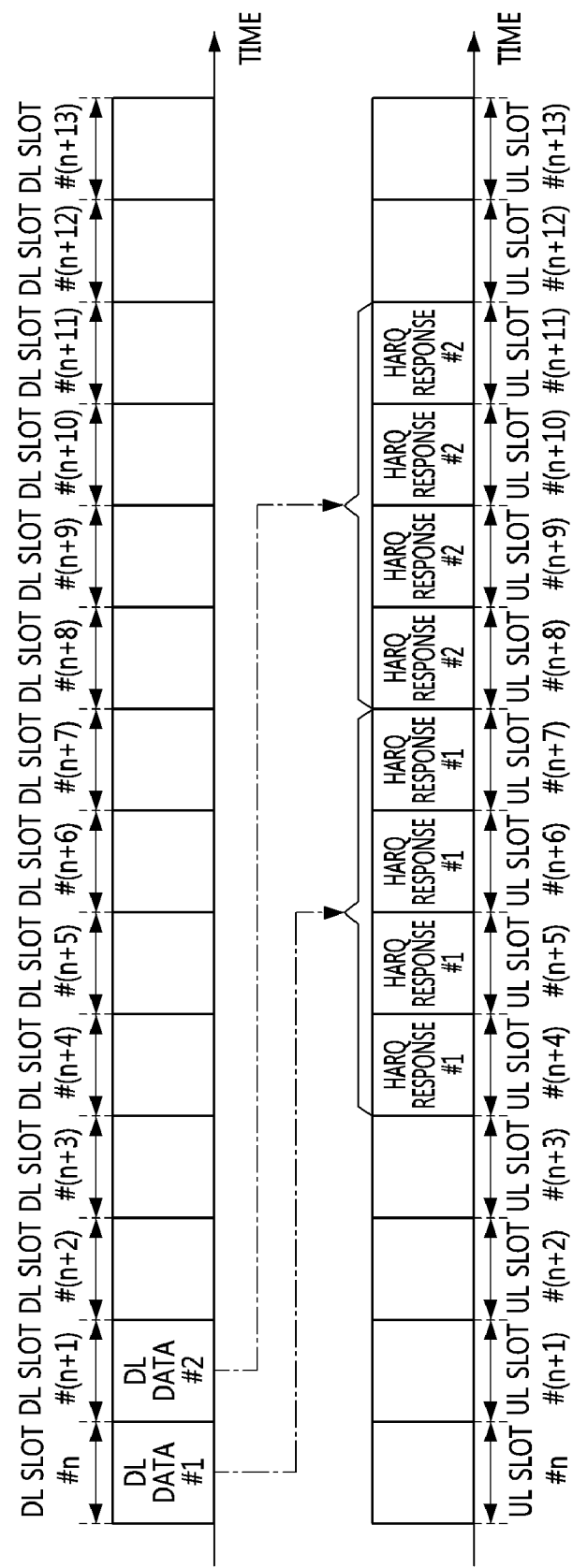
FIG. 19 is a timing chart illustrating a sixth embodiment of a transmission scheme of uplink control/data channel in a communication system.

FIG. 19 is a timing chart illustrating a sixth embodiment of a transmission scheme of uplink control/data channel in a communication system.

In FIG. 19, a slot denoted as 'DL slot' may indicate a slot through which a downlink data channel is transmitted. However, it may not necessarily indicate a downlink slot or a downlink-centric slot. In FIG. 19, a slot denoted as 'UL slot' may indicate a slot through which an uplink control channel is transmitted. However, it may not necessarily indicate an uplink slot or an uplink-centric slot.

Referring to FIG. 19, the base station may transmit a downlink data channel to the terminal. Upon receiving the downlink data channel, the terminal may repeatedly transmit an HARQ response (e.g., uplink control channel) for the downlink data channel four times. The transmission timing of the HARQ response (i.e., the first slot of the uplink slots through which the HARQ response is transmitted) may be indicated by a downlink control channel used for scheduling the corresponding downlink data channel.

For example, the base station may transmit a downlink control channel including information indicating a resource (e.g., DL slot # n) of the downlink data channel #1 and the transmission timing (e.g., UL slot # (n+4)) of the HARQ response #1 for the downlink data channel #1. Also, the base station may transmit a downlink control channel including information indicating a resource (e.g., DL slot # (n+1)) of the downlink data channel #2 and the transmission timing (e.g., UL slot # (n+8)) of the HARQ response #2 for the downlink data channel #2. The terminal receiving the downlink control channel may identify the resource allocated to the downlink data channel and the transmission timing of the HARQ response for the downlink data channel.

In this case, the base station may transmit the downlink data channel #1 in the DL slot # n and the terminal receiving the downlink data channel #1 may repeatedly transmit the HARQ response #1 four times in the UL slots # (n+4) to # (n+7). Also, the base station may transmit the downlink data channel #2 in the DL slot # (n+1) and the terminal receiving the downlink data channel #2 may repeatedly transmit the HARQ response #2 four times in the UL slots # (n+8) to # (n+11). Therefore, the size of the HARQ response codebook may remain the same in the UL slots # (n+4) to # (n+11).

The embodiment described above may be applied to a communication system supporting a plurality of numerology (e.g., a case where numerology of downlink slots is different from that of uplink slots), a communication system supporting TDD, or the like. Even when the repeated transmission of the HARQ response is not completed, the base station may schedule the downlink data channel by informing the terminal of the appropriate transmission timing of the HARQ response.

Alternatively, the base station may inform the terminal of the transmission timing of the HARQ response using a separate downlink control channel. In this case, since the terminal already knows the number (k) of times of repeated transmission of the uplink control channel, the terminal may transmit the HARQ response using the uplink slots located at the foremost among the available uplink slots.

The minimum processing time of the downlink data channel (e.g., the minimum processing time required for generation and transmission of the HARQ response for the downlink data channel) may be configured by an upper layer signaling procedure. Alternatively, the minimum processing time of the downlink data channel may be predefined in the 3GPP TS. In this case, there may be k downlink slots (or downlink-centric slots) corresponding to k uplink slots (or uplink-centric slots) used for the repeated transmission of the HARQ response.

Soft Combining Operation

The terminal may transmit an UCI having different RVs. Here, the UCI may be an HARQ response codebook to which a polar code is applied. When a new HARQ response bit is encoded, the terminal may newly derive an RV of uplink control information including the newly-encoded HARQ response bit.

Referring back to FIG. 13, when the terminal does not have a new HARQ response bit, it may transmit the UCI in the order of (RV a→RV b→RV c→RV d). In slot # (n+4), the terminal may perform an encoding operation on the m-bit HARQ response #1 and may transmit an RV a of UCI including the encoded m bits. In slot # (n+5), the terminal may perform an encoding operation on the m-bit HARQ response #1 and the m'-bit HARQ response #2, and may transmit an RV a of UCI including the encoded (m+m') bits. The terminal may transmit an RV b of the UCI including the encoded (m+m') bits in the slot # (n+6), and the terminal may transmit an RV c of the UCI including the encoded (m+m') bits in the slot # (n+7). In slot # (n+8), the terminal may perform an encoding operation on the m'-bit HARQ response #2 and may transmit an RV a of UCI including the encoded m' bits.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a user equipment (UE) in a communication system, the operation method comprising:
   receiving configuration information indicating a slot format through a higher layer signaling;
   receiving a repetition number (N) of physical uplink control channel (PUCCH) transmission through the higher layer signaling;
   identifying a plurality of slots including non-downlink (DL) symbols based on the slot format; and
   transmitting a PUCCH N times using N slots among the plurality of slots.

2. The operation method of claim 1, wherein, when one slot among N consecutive slots is not used for the PUCCH transmission according to the configuration information, an available slot which corresponds to the configuration information after the N consecutive slots is used for the PUCCH transmission.

3. The operation method of claim 1, wherein the PUCCH is transmitted based on frequency hopping.

* * * * *